US012742649B2

(12) United States Patent
Watahiki et al.

(10) Patent No.: US 12,742,649 B2
(45) Date of Patent: Sep. 22, 2026

(54) ROUTE CONVERSION DEVICE, ROUTE VERIFICATION PROGRAM, AND TEACHING DATA GENERATION METHOD

(71) Applicant: HITACHI ASTEMO, LTD., Hitachinaka (JP)

(72) Inventors: Tomoaki Watahiki, Tokyo (JP); Shinichi Amaya, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 152 days.

(21) Appl. No.: 18/257,971

(22) PCT Filed: Sep. 2, 2021

(86) PCT No.: PCT/JP2021/032297
§ 371 (c)(1),
(2) Date: Jun. 16, 2023

(87) PCT Pub. No.: WO2022/190411
PCT Pub. Date: Sep. 15, 2022

(65) Prior Publication Data

US 2024/0060782 A1 Feb. 22, 2024

(30) Foreign Application Priority Data

Mar. 11, 2021 (JP) ................................ 2021-038876

(51) Int. Cl.
*G01C 21/34* (2006.01)
*G01C 21/32* (2006.01)

(52) U.S. Cl.
CPC ......... *G01C 21/3446* (2013.01); *G01C 21/32* (2013.01)

(58) Field of Classification Search
CPC .......................... G01C 21/3446; G01C 21/32; G01C 21/3407; G09B 29/00; G09B 29/10
See application file for complete search history.

(56) References Cited

U.S. PATENT DOCUMENTS 11,959,767 B2 * 4/2024 Kashu .................. G01C 21/367
2013/0158865 A1 * 6/2013 Na ...................... G01C 21/005
701/446

(Continued)

FOREIGN PATENT DOCUMENTS

JP 2017-509021 A 3/2017
JP 2017-223484 A 12/2017

OTHER PUBLICATIONS

International Search Report with English Translation and Written Opinion of International Patent Application No. PCT/JP2021/032297 dated Oct. 26, 2021 (8 pages).

*Primary Examiner* — Rami Khatib
(74) *Attorney, Agent, or Firm* — Foley & Lardner LLP

(57) ABSTRACT

The present disclosure provides a route conversion apparatus which enables, in a case where a first route based on first map data is converted into a second route based on second map data in a range which is narrower than a section of an electronic map, an error of the converted second route to be detected, and conversion into a correct second route to be performed. The route conversion apparatus 100 includes a route conversion unit 122*a* that generates a second route RT2 based on location reference information LRI of a first route RT1, a storage unit 121 that stores a route verification model RVM, and a route verification unit 122*b* that inputs the second map data MD2, the location reference information LRI, and the second route RT2 to the route verification model RVM to verify whether the second route RT2 is correct or incorrect.

6 Claims, 16 Drawing Sheets

(56) References Cited

U.S. PATENT DOCUMENTS

2017/0016730 A1 1/2017 Gawrilow
2019/0162544 A1* 5/2019 Sekiguchi .......... G01C 21/3691
2019/0162547 A1* 5/2019 Ootsuji .................. G09B 29/00

* cited by examiner 110
113
RT1
G
MD1
N1
N1
L1
RT1
LRI
TRANSMIT
120
ROUTE
CONVERSION DEVICE
MD2
N2
N2
L2
RT2(T)
RT2(F)

FIG. 10

RVM
GD
Ly1
Ly2
Ly5
LyF
CNV
AFF
RVR
CORRECT
INCORRECT
0.11
0.89
Softmax FUNCTION

FIG. 12

AFF $\hat{h}_i^1$

5

$W, b$ $\sigma$ $h_i^2$

256

ROUTE CONVERSION DEVICE, ROUTE VERIFICATION PROGRAM, AND TEACHING DATA GENERATION METHOD

TECHNICAL FIELD

The present disclosure relates to a route conversion apparatus, a route verification program, and a method for generating training data.

BACKGROUND ART

In an area covered by an electronic map having a plurality of sections representing navigable sections of a conventionally navigable network, a method for reconfiguring a route through the navigable network is known (Patent Literature 1. The method disclosed in Patent Literature 1 includes acquiring data and using the acquired data.

In this conventional method, acquiring the data entails acquiring data indicating a group of line segments representing the route passing through the navigable network, and the route is reconfigured in association with an electronic map. Further, using the data involves using the acquired data indicating the group of line segments in generating the route passing through the navigable network represented by the electronic map.

In this conventional method, the generated route provides a reconfiguration of the route represented by the group of line segments passing through the navigable network in association with the electronic map. The generation of the route also includes preferentially handling sections of the electronic map included in the generated route which are located closer to the group of line segments represented on the electronic map.

CITATION LIST

Patent Literature

PTL 1: JP 2017-509021 A

SUMMARY OF INVENTION

Technical Problem

In general, each side of a section of the electronic map has a size of about several kilometers. Therefore, the above-described conventional method is not necessarily effective in a case where a route is reconfigured in a range which is narrower than one section of the electronic map. For example, in a case where a road recorded in the first map data is not recorded in the second map data, when a route based on the first map data is converted into a route based on the second map data, conversion to an incorrect route will likely occur.

The present disclosure provides a route conversion apparatus, and peripheral technology thereof, which enable, in a case where a first route based on first map data is converted into a second route based on second map data in a range which is narrower than a section of an electronic map, an error of the converted second route to be detected, and conversion into a correct second route to be performed.

Solution to Problem

One aspect of the present disclosure is a route conversion apparatus that converts a first route based on first map data into a second route based on second map data, the route conversion apparatus including: a route conversion unit that generates the second route based on location reference information of the first route; a storage unit that stores a route verification model; and a route verification unit that inputs the second map data, the location reference information, and the second route to the route verification model to verify whether the second route is correct or incorrect.

Advantageous Effects of Invention

With the above aspect of the present disclosure, it is possible to provide a route conversion apparatus which enables, in a case where a first route based on first map data is converted into a second route based on second map data in a range which is narrower than a section of an electronic map, an error of the converted second route to be detected, and conversion into a correct second route to be performed.

BRIEF DESCRIPTION OF DRAWINGS

FIG. 10 is a conceptual view of a route verification model stored in a storage unit of the route verification apparatus of FIG. 1.

FIG. 12 is a view illustrating an example of full join processing in the first layer of the route verification model of FIG. 10.

DESCRIPTION OF EMBODIMENTS

Hereinafter, embodiments of a route conversion apparatus, a route verification program, and a method for generating training data according to the present disclosure will be described with reference to the drawings.

First Embodiment

Figure 1:
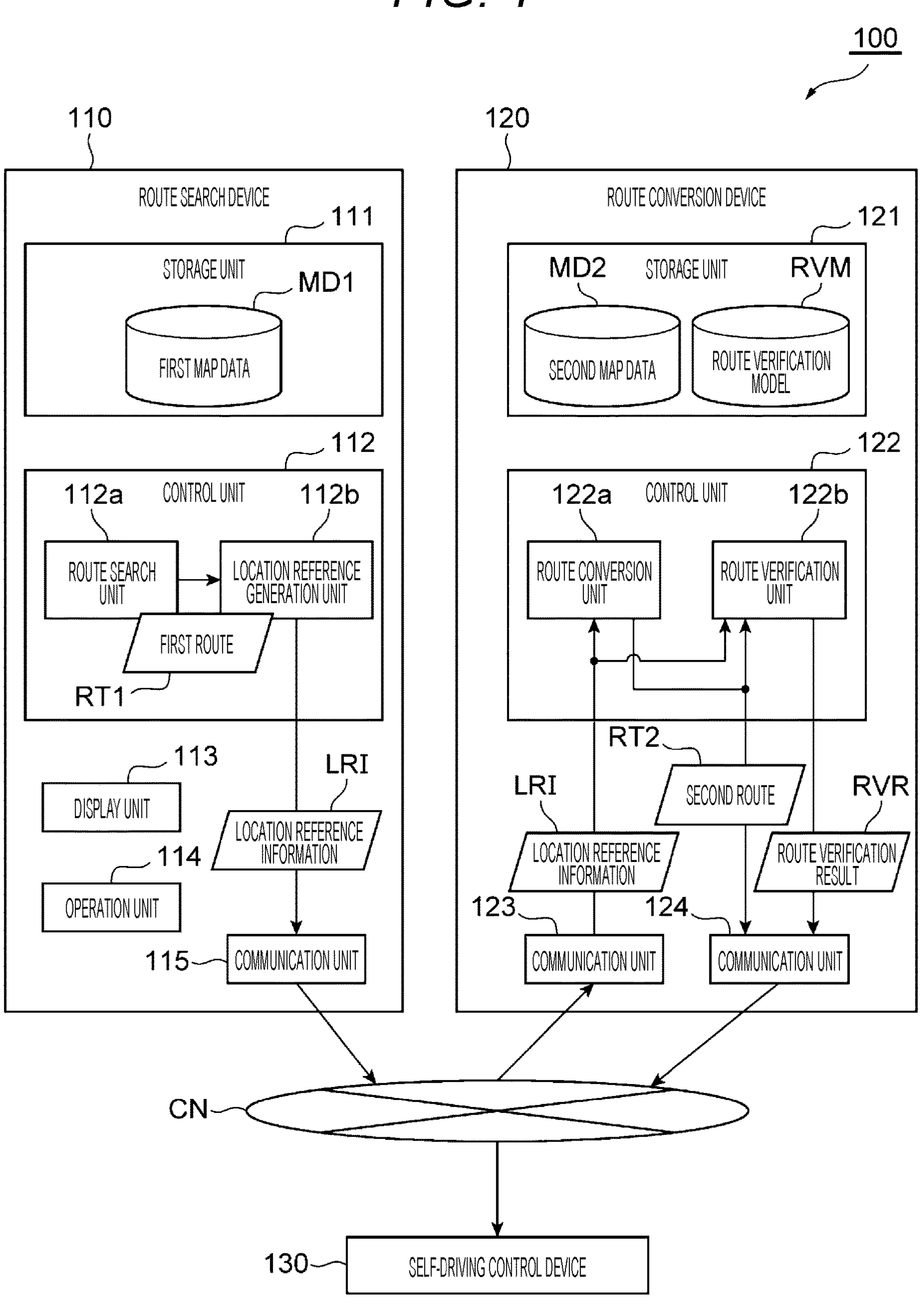
FIG. 1 is a block diagram illustrating a first embodiment of a route conversion apparatus according to the present disclosure.

FIG. 1 is a block diagram illustrating a first embodiment of the route conversion apparatus according to the present disclosure. A route conversion apparatus 100 according to the present embodiment is, for example, an apparatus that converts a first route RT1 based on first map data MD1 into a second route RT2 based on second map data MD2 different from the first map data MD1.

The route conversion apparatus 100 includes at least a route conversion device 120. The route conversion apparatus 100 may further include, for example, a route search device 110, and may further include a self-driving control device 130. That is, the route conversion apparatus 100 is a device including one or more devices.

The route search device 110 is, for example, a car navigation system mounted in a vehicle, and includes a receiver of a Global Navigation Satellite System (GNSS). The route search device 110 generates a first route RT1, which is a route from a departure point to a destination of the vehicle, based on, for example, first map data MD1 which is map data for car navigation. The route search device 110 transmits the first route RT1 based on the generated first map data MD1 to the route conversion device 120 via a communication network CN such as a controller area network (CAN) or an in-vehicle LAN.

The route conversion device 120 is, for example, an electronic control unit (ECU) mounted in a vehicle. The route conversion device 120 converts the first route RT1 based on the first map data MD1 received from the route search device 110 into, for example, a second route RT2 based on the second map data MD2 such as a high-precision map for self-driving (an HD map), and reconfigures the second route RT2. The route conversion device 120 transmits information on the reconfigured second route RT2 to the self-driving control device 130 via the communication network CN.

The self-driving control device 130 is, for example, an ECU mounted in a vehicle. The self-driving control device 130 is connected to, for example, various sensors and various actuators mounted in the vehicle. The self-driving control device 130 controls the various actuators by using the results of detection by the various sensors, and executes self-driving to cause the vehicle to autonomously travel along the second route RT2 based on the second map data MD2 received from the route conversion device 120.

The route search device 110 includes, for example, a storage unit 111, a control unit 112, a display unit 113, an operation unit 114, and a communication unit 115. The storage unit 111 includes, for example, a memory of a microcontroller constituting the route conversion device 120 or a storage device such as a hard disk, and stores the first map data MD1. For example, as described above, the first map data MD1 is map data for car navigation having lower accuracy than the HD map.

The operation unit 114 is, for example, a human-machine interface including an input device such as a touch panel. An occupant of the vehicle sets a destination, for example, by operating the operation unit 114. The operation unit 114 outputs, for example, information on the destination set by the occupant operation to the control unit 112.

The control unit 112 includes, for example, a microcontroller, and executes a series of processing steps of the car navigation system. The control unit 112 includes, for example, a route search unit 112*a* and a location reference generation unit 112*b*. Each unit of the control unit 112 represents, for example, a function or a software module of the control unit 112 that is realized due to a program, which is stored in a storage device such as a memory, being executed by a central processing unit (CPU) of the microcontroller constituting the control unit 112. Note that each unit of the control unit 112 may also be configured by dedicated hardware such as a microcontroller.

For example, the route search unit 112*a* acquires information on the destination from the operation unit 114, acquires the location of the vehicle from a GNSS receiver, and acquires the first map data MD1 from the storage unit 111. Further, the route search unit 112*a* generates, for example, information of the first route RT1 from the departure point to the destination of the vehicle based on the first map data MD1.

The location reference generation unit 112*b* acquires information on the first route RT1 from the route search unit 112*a*. The location reference generation unit 112*b* generates location reference information LRI of the first route RT1 from the information of the first route RT1 based on the first map data MD1. The location reference generation unit 112*b* outputs the generated location reference information LRI to the communication unit 115, for example. The location reference information LRI is used for processing, in the route conversion device 120, to convert the first route RT1 based on the first map data MD1 into the second route RT2 based on the second map data MD2. Details of the location reference information LRI will be described below.

The communication unit 115 is, for example, an input/output unit of a microcontroller constituting the route search device 110, and communicates with the communication unit 123 of the route conversion device 120 via the communication network CN. The communication unit 115 transmits the location reference information LRI inputted from the location reference generation unit 112*b* to the route conversion device 120 via, for example, the communication network CN.

The display unit 113 includes, for example, a liquid-crystal display device, an organic EL display device, a head-up display, or the like, and displays the first route RT1 from the departure point to the destination of the vehicle generated by the route search unit 112*a*.

The route conversion device 120 includes, for example, a storage unit 121, a control unit 122, and communication units 123, 124. The storage unit 121 includes, for example, a storage device such as a memory or a hard disk of a microcontroller constituting the route conversion device 120. The storage unit 121 stores second map data MD2 such as an HD map and a route verification model RVM for verifying whether the second route RT2 based on the second map data MD2 is correct or incorrect.

The control unit 122 includes, for example, a microcontroller, and executes a series of processing for generating a second route RT2 based on the second map data MD2 such as an HD map from the first route RT1 based on the first map data MD1 for car navigation.

The control unit 122 includes, for example, a route conversion unit 122*a* and a route verification unit 122*b*. Each unit of the control unit 122 represents, for example, a function or a software module of the control unit 122 that is realized due to a program, which is stored in a storage device such as a memory, being executed by a CPU of a microcontroller constituting the control unit 122. Note that each unit of the control unit 122 may be configured by dedicated hardware such as a microcontroller.

The route conversion unit 122*a* generates and reconfigures a second route RT2 based on the second map data MD2 stored in the storage unit 121, for example, from the location reference information LRI of the first map data MD1 acquired from the route search device 110 via the communication network CN and the communication unit 123. The route verification unit 122*b* verifies whether the second route RT2 generated by the route conversion unit 122*a* is correct or incorrect, for example, using the location reference information LRI, and the second map data MD2 and the route verification model RVM which are stored in the storage unit 121. The route verification unit 122*b* generates a route verification result RVR representing the result of the verification, and outputs the route verification result RVR to the communication unit 124 together with the second route RT2, for example.

The communication units 123, 124 are, for example, input/output units of the microcontroller constituting the route conversion device 120. The communication unit 123 communicates with the communication unit 115 of the route search device 110 via the communication network CN. The communication unit 124 communicates with the self-driving control device 130 via the communication network CN. Note that the route search device 110, the route conversion device 120, and the self-driving control device 130 may be connected to each other so as to directly communicate with each other without going through the communication network CN.

Figure 2:
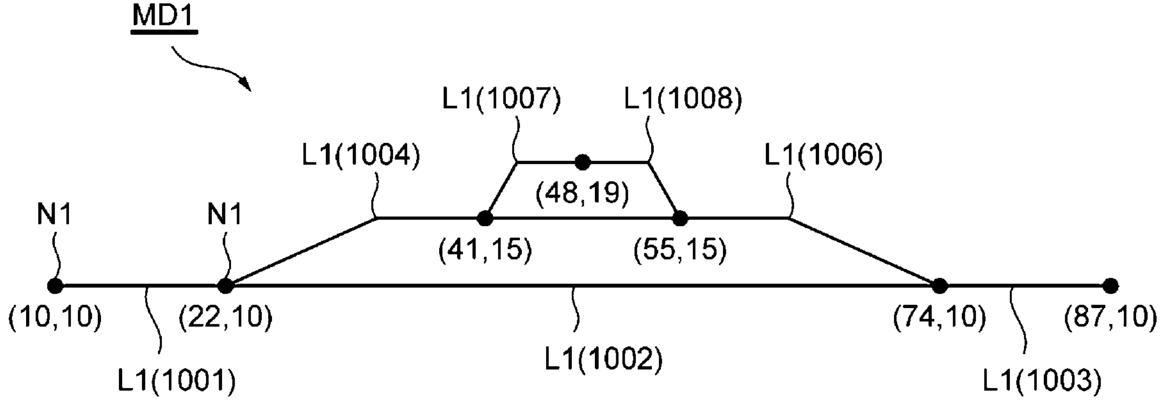
FIG. 2 is a view illustrating an example of first map data in the route conversion apparatus of FIG. 1.

FIG. 2 is a view illustrating an example of the first map data MD1 in the route conversion apparatus 100 of FIG. 1. The first map data MD1 records, for example, a road network including a plurality of nodes N1 and a plurality of links L1. The nodes N1 are intersections or other road network nodes. The links L1 are road sections between one node N1 and another node N1. Each of the nodes N1 has unique coordinates, and each of the links L1 has a unique link ID: 1001 to 1008.

For example, as shown in Table 1 below, the first map data MD1 includes information such as the link ID of each link L1 constituting the road network shown in FIG. 2, the coordinates of the node N1 at the start point, the coordinates of the node N1 at the end point, and the orientation. Note that, in the example shown in Table 1, the orientations of the links L1 are represented by an angle of 360 degrees clockwise, with the upward direction in FIG. 2 set at 0 degrees, for example.

TABLE 1

| | Start point | | End point | | |
|---|---|---|---|---|---|
| Link ID | X coordinate | Y coordinate | X coordinate | Y coordinate | Orientation |
| . | . | . | . | . | . |
| . | . | . | . | . | . |
| . | . | . | . | . | . |
| 1001 | 10 | 10 | 22 | 10 | 90 |
| 1002 | 22 | 10 | 74 | 10 | 90 |
| 1003 | 74 | 10 | 87 | 10 | 90 |
| 1004 | 22 | 10 | 41 | 15 | 65 |
| 1005 | 41 | 15 | 55 | 15 | 90 |
| 1006 | 55 | 15 | 74 | 10 | 90 |
| 1007 | 41 | 15 | 48 | 19 | 26 |
| 1008 | 48 | 19 | 55 | 15 | 90 |
| . | . | . | . | . | . |
| . | . | . | . | . | . |
| . | . | . | . | . | . |

In general, in the map data, there are nodes N1 having the same or different coordinates (X, Y), such as a node N1 of an elevated road and a node N1 of a road passing therebelow. However, in the example of the first map data MD1 illustrated in FIG. 2 and Table 1, if the coordinates are the same, the nodes N1 are assumed to be the same. For example, the node N1 at the end point of the link L1 with the link ID 1001 and the node N1 at the start point of the link L1 with the link ID 1004 both have coordinates (X, Y) of (22, 10). In this case, the end point of the link L1 with the link ID 1001 and the start point of the link L1 with the link ID 1004 are connected.

Figure 3:
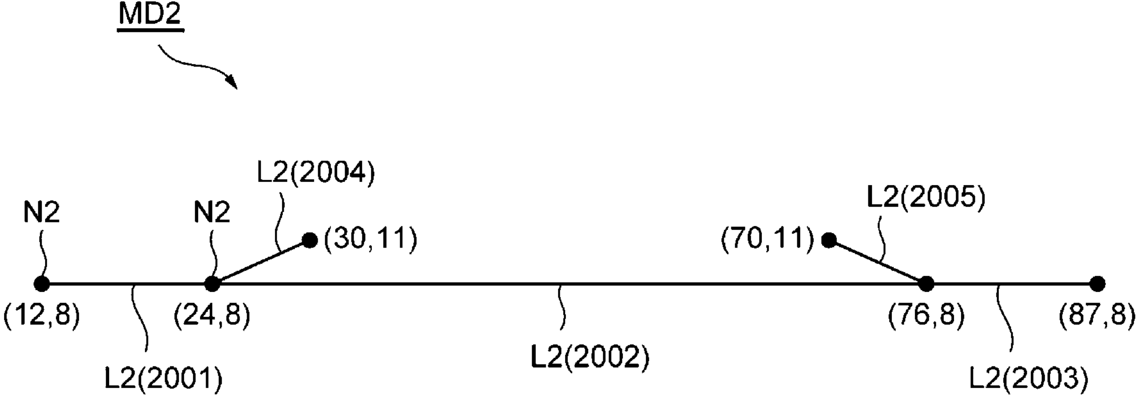
FIG. 3 is a view illustrating an example of second map data in the route conversion apparatus of FIG. 1.

FIG. 3 is a view illustrating an example of the second map data MD2 in the route conversion apparatus 100 of FIG. 1. Similarly to the first map data MD1 illustrated in FIG. 2, the second map data MD2 records a road network including a plurality of nodes N2 and a plurality of links L2. For example, as shown in Table 2 below, the second map data MD2 includes information such as the link ID of each link L2 constituting the road network shown in FIG. 3, the coordinates of the node N2 at the start point, the coordinates of the node N2 at the end point, and the orientation.

TABLE 2

| | Start point | | End point | | |
|---|---|---|---|---|---|
| Link ID | X coordinate | Y coordinate | X coordinate | Y coordinate | Orientation |
| 2001 | 12 | 8 | 24 | 8 | 90 |
| 2002 | 24 | 8 | 76 | 8 | 90 |
| 2003 | 76 | 8 | 87 | 8 | 90 |
| 2004 | 24 | 8 | 30 | 11 | 65 |
| 2005 | 70 | 11 | 76 | 8 | 115 |
| . | . | . | . | . | . |
| . | . | . | . | . | . |
| . | . | . | . | . | . |

The road of the first map data MD1 in FIG. 2 and Table 1 and the road of the second map data MD2 in FIG. 3 and Table 2 indicate roads at the same place. However, some of the nodes N1, and the nodes N2 and the links L2 corresponding to the links L1, which are recorded in the first map data MD1, are sometimes not recorded in the second map data MD2. In addition, for example, there may be a slight error between coordinates (X, Y) of the node N1 of the first map data MD1 and the node N2 of the second map data MD2 corresponding to the node N1.

Figure 4:
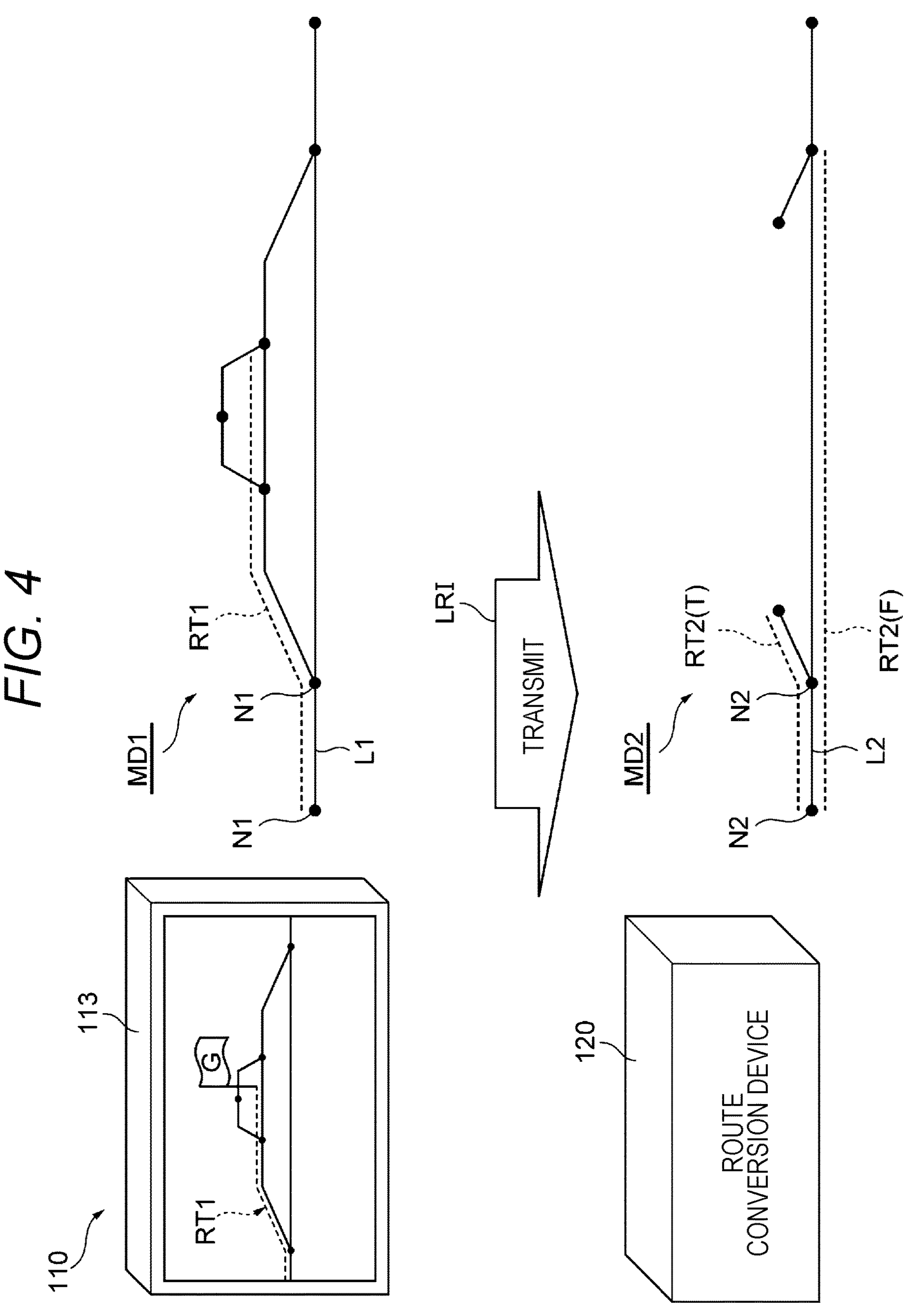
FIG. 4 is a conceptual view illustrating an operation of the route conversion apparatus of FIG. 1.

FIG. 4 is a conceptual view illustrating operation of the route conversion apparatus 100 of FIG. 1. As described above, the route search device 110 displays, on the display unit 113, the first route RT1, which is based on the first map data MD1 from the departure point of the vehicle to a destination G, generated by the route search unit 112*a*. As described above, the route search device 110 transmits the location reference information LRI of the first route RT1 based on the first map data MD1 to the route conversion device 120 via the communication unit 115. The route conversion device 120 selects a road corresponding to the location reference information LRI of the first route RT1 from the second map data MD2 and reconfigures the second route RT2 based on the second map data MD2.

However, sometimes a portion of the road included in the first route RT1 based on the first map data MD1 is not recorded in the second map data MD2. Therefore, as illustrated in the lower part of FIG. 4, the second route RT2 based on the second map data MD2 may be two routes, including a route which goes straight through the second node N2 from the left, and a route which branches from the identical node N2 to the left in the direction of travel.

In the present embodiment, among the two second routes RT2 described above, the second route RT2 matching the first route RT1 based on the first map data MD1 within the range recorded in the second map data MD2 is defined as a correct answer T. Further, in the present embodiment, among the two second routes RT2 described above, the second route RT2, which includes a road different from the road included in the first route RT1 based on the first map data MD1, is defined as an incorrect answer F.

The route conversion device 120 verifies, for example, the second route RT2 reconfigured by the route conversion unit 122*a*, using the route verification unit 122*b*, and generates the route verification result RVR including the correct answer T or the incorrect answer F. The route conversion device 120 transmits, for example, the route verification result RVR generated by the route verification unit 122*b* to the self-driving control device 130, by using the communication unit 124 together with the second route RT2 reconfigured by the route conversion unit 122*a*.

Figure 5:
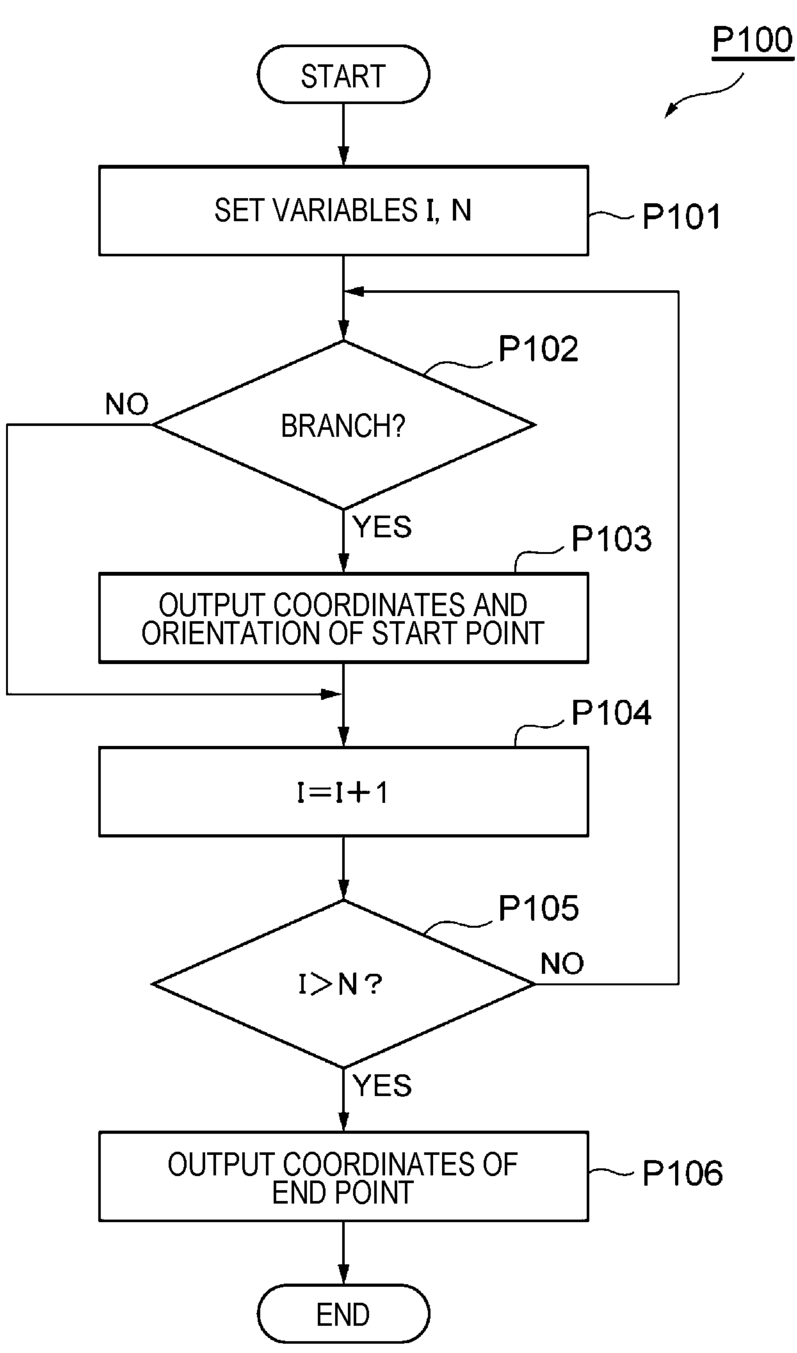
FIG. 5 is a flowchart illustrating an example of the operation of a route search device in the route conversion apparatus of FIG. 1.

FIG. 5 is a flowchart illustrating an example of the operation of the location reference generation unit 112*b* of the route search device 110 in FIG. 1. When acquiring the first route RT1 having a configuration like that illustrated in Table 3 below from the route search unit 112*a*, for example, the location reference generation unit 112*b* starts processing P100 to generate the location reference information LRI as shown in FIG. 5.

TABLE 3

| Number | Link ID |
|---|---|
| . | . |
| . | . |
| . | . |
| N-2 | 1001 |
| N-1 | 1004 |
| N | 1005 |

As illustrated in Table 3, the first route RT1 includes, for example, link IDs of a plurality of links L1 included in the first route RT1, and numbers 1 to N (N is a natural number of 2 or more) appended to the link IDs. The numbers 1 to N indicate the order of a series of links L1 through which the host vehicle passes from the departure point to the destination G. The example shown in Table 3 indicates that the first route RT1 has, before the destination G, a link L1 with a link ID 1001, a link L1 with a link ID 1004, and a link L1 with a link ID 1005.

When acquiring the first route RT1 having a configuration like that illustrated in Table 3, the location reference generation unit 112*b* first executes processing P101 to set variables I and N. In processing P101, for example, the location reference generation unit 112*b* sets the variable I to "1" and sets the variable N to "N", which is the number of rows of the first route RT1. Next, the location reference generation unit 112*b* executes processing P102 to determine whether or not the node N1 at the start point of the I-th (I-th row) link L1 of the first route RT1 has a link L1 branching in a direction different from the (I+1)-th (I+1-th row) link L1 of the first route RT1.

In this processing P102, upon determining that the node N1 at the start point has the link L1 branching as described above (YES), the location reference generation unit 112*b* executes processing P103 to output the coordinates (X, Y) and the orientation of the node N1 at the start point. Thereafter, the location reference generation unit 112*b* executes processing P104 to newly set a value obtained by adding 1 to the variable I as the variable I and increment the variable I.

On the other hand, upon determining, in the processing P102, that the node N1 at the start point does not have the link L1 branching as described above (NO), the location reference generation unit 112*b* executes the processing P104 without executing the processing P103. After the processing P104 ends, the location reference generation unit 112*b* executes processing P105 to determine whether the variable I is larger than the variable N, which is the number of rows of the first route RT1.

In processing P105, upon determining that the variable I is equal to or less than the variable N (NO), the location reference generation unit 112*b* returns to the above-described processing P102. On the other hand, in processing P105, upon determining that the variable I is larger than the variable N (YES), the location reference generation unit 112*b* executes processing P106 to output the coordinates (X, Y) of the node N1 at the end point of the N-th (N-th row) link L1. Thereafter, the location reference generation unit 112*b* ends the processing P100 to generate the location reference information LRI illustrated in FIG. 5.

An example of the configuration of the location reference information LRI generated by the above processing P100 of the location reference generation unit 112*b* is illustrated in Table 4 below. As shown in Table 4, the location reference information LRI includes, for example, a plurality of map point numbers and their X coordinate, Y coordinate, and orientation.

TABLE 4

| Map point number | X coordinate | Y coordinate | Orientation |
|---|---|---|---|
| . | . | . | . |
| . | . | . | . |
| . | . | . | . |
| N-2 | 22 | 10 | 65 |
| N-1 | 41 | 15 | 90 |
| N | 55 | 15 | — |

Figure 6:
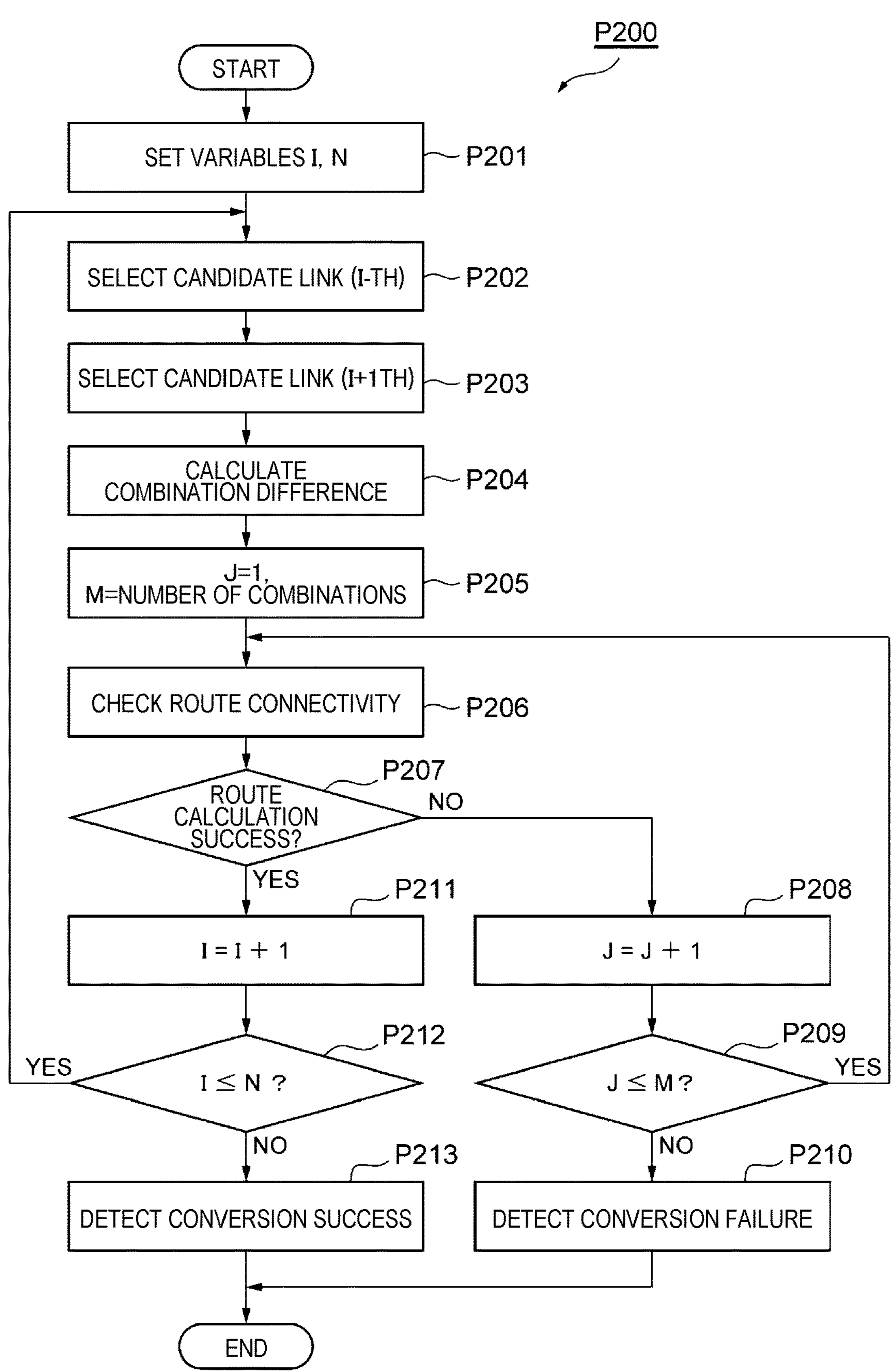
FIG. 6 is a flowchart illustrating an example of the operation of a route conversion device in the route conversion apparatus of FIG. 1.

FIG. 6 is a flowchart illustrating an example of the operation of the route conversion device 120 in the route conversion apparatus 100 of FIG. 1. The route conversion device 120 receives the location reference information LRI of the first route RT1 based on the first map data MD1 like that shown in Table 4, from the route search device 110, for example. Thereupon, for example, as illustrated in FIG. 6, the route conversion device 120 starts processing P200 to generate the second route RT2 based on the second map data MD2 from the location reference information LRI of the first route RT1 based on the first map data MD1.

Upon starting the processing P200, for example, the route conversion device 120 uses the route conversion unit 122*a* to execute processing P201 to set the variable I to "1" and set the variable N to a value "N−1" obtained by subtracting 1 from the number of rows of the location reference information LRI.

Next, the route conversion device 120 executes processing P202 to select, using the route conversion unit 122*a*, one or more candidate links corresponding to the map point number of the I-th row (I-th) of the location reference information LRI from among the plurality of links L2 of the second map data MD2, for example. Thereafter, the route conversion device 120 executes processing P203 to select, using the route conversion unit 122*a*, one or more candidate links corresponding to the map point number of the (I+1)th row ((I+1)th) of the location reference information LRI from among the plurality of links L2 of the second map data MD2, for example.

Figure 7:
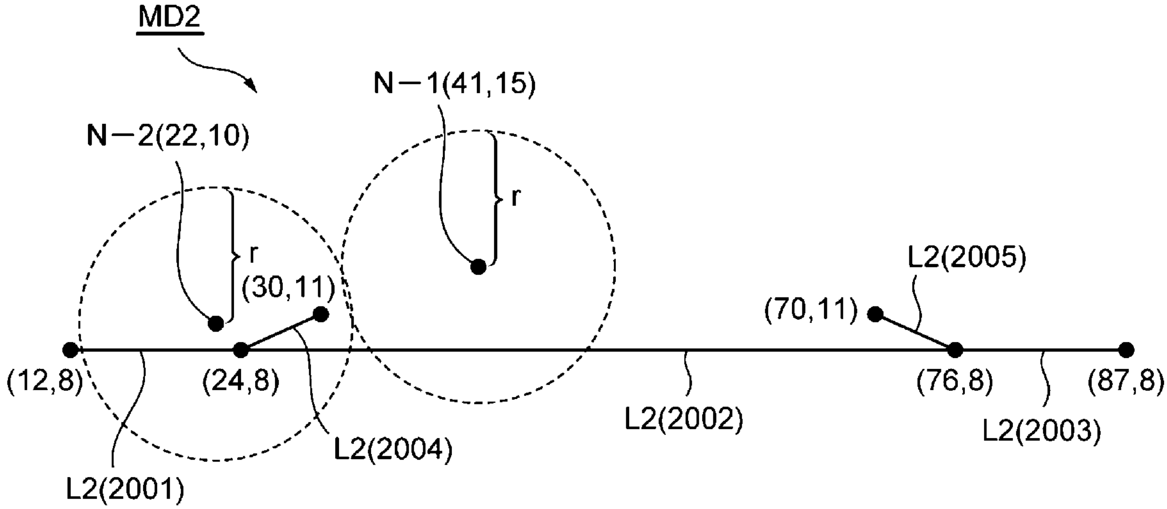
FIG. 7 is a conceptual view to describe processing to select candidate links in FIG. 6.

FIG. 7 is a conceptual view illustrating the processing P202, 203 to select the candidate links of FIG. 6. In the processing P202 described above, for example, it is assumed that the variable I is "N−2". In this case, the route conversion unit 122*a* selects, as a candidate link, a link L2 included in a range of a radius r centered on the coordinates (X, Y)=(22, 10) of the map point number N−2 shown in Table 4 among the plurality of links L2 of the second map data MD2 shown in FIG. 7. As a result, for example, three links L2 with link IDs 2001, 2002, and 2004 are selected.

Further, in this processing P202, the route conversion unit 122*a* calculates the nearest coordinates (X, Y) with respect to the coordinates (X, Y) of the map point number N−2 of the location reference information LRI for each link L2 of the selected link IDs 2001, 2002, and 2004. The nearest coordinates (X, Y) are coordinates (X, Y) having the smallest difference from the coordinates (X, Y)=(22, 10) of the map point number N−2 of the location reference information LRI among the coordinates (X, Y) included in each link L2.

Further, in this processing P202, the route conversion unit 122*a* calculates the difference between each link L2 and the coordinates (X, Y) of the map point number N−2 of the location reference information LRI on the basis of the nearest coordinates (X, Y) of each link L2 and the orientation at the nearest coordinates (X, Y) of each link L2, for example, as shown in Table 5 below. This difference can be calculated, for example, by an arbitrary calculation formula based on the difference in distance and orientation between the nearest coordinates (X, Y) of each link L2 and the coordinates (X, Y)=(22, 10) of the map point number N−2 of the location reference information LRI.

TABLE 5

| Link ID | Nearest X coordinate | Nearest Y coordinate | Orientation | Difference |
|---|---|---|---|---|
| 2001 | 22 | 8 | 90 | 260.00 |
| 2002 | 24 | 8 | 90 | 264.14 |
| 2004 | 24 | 8 | 65 | 14.14 |

Further, in this processing P202, the route conversion unit 122*a* selects the link ID 2004 having the smallest difference, as illustrated in Table 5, for example. In addition, the processing P203, the route conversion unit 122*a* executes the same processing as the processing P202 described above on the coordinates (X, Y)=(41, 15) of the map point number N−1 of the location reference information LRI illustrated in FIG. 7 and Table 4. As a result, in processing P203, the route conversion unit 122*a* selects the link L2 with the link ID 2002 having the smallest difference, as illustrated in Table 6 below.

TABLE 6

| Link ID | Nearest X coordinate | Nearest Y coordinate | Orientation | Difference |
|---|---|---|---|---|
| 2002 | 41 | 8 | 90 | 35.00 |

Next, as illustrated in FIG. 6, the route conversion device 120 executes processing P204 to calculate a combination difference. In this processing P204, the route conversion device 120 calculates the combination difference of the two links L2 selected in the processing P202, 203 described above. For example, the route conversion device 120 calculates, using the route conversion unit 122*a*, a combination difference for each combination of the respective candidate links (Table 5) for the map point number N−2 of the location reference information LRI (Table 4) and each candidate link (Table 6) for the map point number, as illustrated in Table 7 below, for example.

TABLE 7

| Candidate link (N-2) | | Candidate link (N-1) | | | |
|---|---|---|---|---|---|
| Link ID | Difference | Link ID | Difference | Combination difference | Evaluation rank |
| 2001 | 260.00 | 2002 | 35.00 | 9100.00 | 2 |
| 2002 | 264.14 | 2002 | 35.00 | 9244.97 | 3 |
| 2004 | 14.14 | 2002 | 35.00 | 494.97 | 1 |

The combination difference is calculated based on, for example, a difference between candidate links with one map point number N−2 and a difference between candidate links with the other map point number N−1 among the two map point numbers N−2 and N−1 included in the location reference information LRI of the first map data MD1. More specifically, in the example illustrated in Table 7, the combination difference is the product of the difference of the candidate links of one map point number N−2 and the difference of the candidate links of the other map point number N−1.

Further, in this processing P204, the route conversion unit 122*a* sets, as a first rank, the evaluation rank of the combination of the candidate links having the smallest combination difference (for example, a combination of a link L2 with a link ID 2004 and a link L2 with a link ID 2002), as illustrated in Table 7. In addition, the route conversion unit 122*a* assigns a higher evaluation rank to a combination of candidate links having a smaller combination difference.

Next, the route conversion device 120 executes, using the route conversion unit 122*a*, for example, processing P205 to set the variable J to 1 and set the variable M to the number of combinations of candidate links, as illustrated in FIG. 6. In the example illustrated in Table 7, because the number of combinations of candidate links is three, the route conversion unit 122*a* sets the variable M as 3 in the processing P205.

Next, the route conversion device 120 executes, using the route conversion unit 122*a*, for example, processing P206 to check the route connectivity, as illustrated in FIG. 6. Here, the route conversion unit 122*a* processes a combination of candidate links having a Jth evaluation rank among combinations of a plurality of candidate links as illustrated in Table 7. That is, the processing of processing P206 illustrated in FIG. 6, and subsequent processing, are executed on the candidate link combinations in descending order, from the candidate link combination with the highest evaluation rank to the combination with the lowest evaluation rank.

More specifically, in the example illustrated in Table 7 and FIG. 7, in the initial processing P206, the route conversion unit 122*a* checks the connectivity between the link L2 with the link ID 2004 and the link L2 with the link ID 2002, which is a combination of link candidates with the first evaluation rank. As a result, as illustrated in FIG. 7, the route conversion unit 122*a* checks that there is no route connected from the link L2 with the link ID 2004 to the link L2 with the link ID 2002, that is, there is no route connectivity.

Next, as illustrated in FIG. 6, for example, the route conversion device 120 executes processing P207 to determine whether the route calculation is successful. In this processing P207, the route conversion device 120 determines, using the route conversion unit 122*a*, for example, whether the route calculation is successful on the basis of the route connectivity checked in the previous processing P206. More specifically, for example, in a case where the route conversion unit 122*a* checks that there is no route connectivity in the previous processing P206, the route conversion unit 122*a* determines route calculation failure (NO) in this processing P207.

In this case, the route conversion device 120 executes, using the route conversion unit 122*a*, incrementation processing P208 to newly set a value, obtained by adding 1 to the variable J, as the variable J. Next, the route conversion device 120 executes, using the route conversion unit 122*a*), for example, processing P209 to determine whether the variable J is equal to or less than the variable M (the number of combinations of candidate links in Table 7). Upon determining, in the processing P209, that the variable J is equal to or less than the variable M (the number of combinations of candidate links in Table 7) (YES), the route conversion device 120 executes the above-described processing P206 again.

On the other hand, upon determining, in the processing P209, that the variable J is larger than the variable M (the number of candidate link combinations in Table 7) (NO), the route conversion device 120 executes, using the route conversion unit 122*a*, for example, processing P210 to detect route conversion failure, and ends the processing illustrated in FIG. 6. As a result, the route conversion device 120 detects that the conversion from the first route RT1 based on the first map data MD1 to the second route RT2 based on the second map data MD2 has failed.

In the examples illustrated in FIG. 7 and Table 7, it is checked in the initial processing P206 that there is no connectivity between the link L2 with the link ID 2004 and the link L2 with the link ID 2002, and it is determined in the subsequent processing P207 that the route calculation has failed (NO). Furthermore, in the subsequent processing P208, the variable J=1 is newly set as the variable J=1+1=2, and in the subsequent processing P209, it is determined that the variable J=2 is equal to or less than the variable M (the number of candidate link combinations in Table 7)=3 (YES), and the second processing P206 is executed.

In the second processing P206, for example, as illustrated in FIG. 7 and Table 7, the route conversion unit 122*a* checks the connectivity between the link L2 having the link ID 2001 and the link L2 having the link ID 2002, which is a combination of link candidates having the second evaluation rank. As a result, the route conversion unit 122*a* checks that there is a route connecting from the link L2 with the link ID 2001 to the link L2 with the link ID 2002, that is, there is route connectivity.

As a result, in the next processing P207, the route conversion device 120 executes, using the route conversion unit 122*a*, for example, incrementation processing P211 to determine route calculation success (YES) and newly set a value, obtained by adding 1 to the variable I, as the variable I. Next, the route conversion device 120 executes, using the route conversion unit 122*a*, for example, processing P212 to determine whether the variable I is equal to or less than the variable N.

Here, the variable I is set at "1" in the above-described processing P201, and then incremented and set at "2" in the initial processing P211. In addition, the variable N is set at a value "N−1" obtained by subtracting 1 from the number of rows N of the location reference information LRI in the above-described processing P201. Therefore, in a case where the number of rows N of the location reference information LRI shown in Table 3 is three or more, the route conversion unit 122*a* determines in processing P212 that the variable I is equal to or less than the variable N (YES). Thereupon, the route conversion device 120 repeatedly executes the processing from the processing P202 to the processing P211 described above.

On the other hand, upon determining that the variable I is larger (NO) than the variable N (the number of rows N−1 of the location reference information LRI) in the processing P212, the route conversion device 120 executes, using the route conversion unit 122*a*, for example, processing P213 to detect the success of the route conversion and ends the processing P200 illustrated in FIG. 6. As a result of the processing P200, as illustrated in FIG. 4, the route conversion device 120 detects the success of the route conversion from the first route RT1 based on the first map data MD1 to the second route RT2 based on the second map data MD2.

Nevertheless, in the processing P200 described above, the second route RT2 based on the second map data MD2 reconfigured by the route conversion device 120 is an incorrect answer F including a road different from the road included in the first route RT1 based on the first map data MD1 as illustrated in FIG. 4. For example, the route conversion device 120 verifies, using the route verification unit 122*b*, whether the second route RT2 is correct or incorrect based on the second map data MD2 reconfigured, by the route conversion unit 122*a*, from the first route RT1 based on the first map data MD1. The route conversion device 120 is thus prevented from transmitting the incorrect second route RT2 (F) to the self-driving control device 130.

Figure 8:
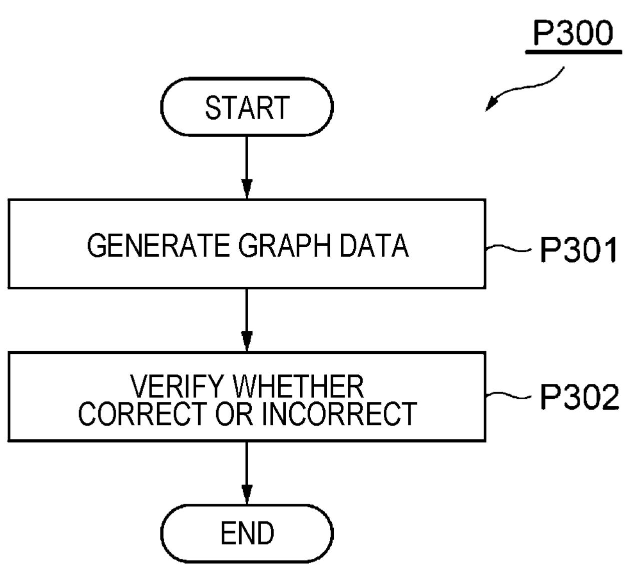
FIG. 8 is a flowchart illustrating an example of the operation of a route verification unit in the route conversion apparatus of FIG. 1.

FIG. 8 is a flowchart illustrating an example of the operation of the route verification unit 122*b* in the route conversion apparatus 100 of FIG. 1. Upon acquiring the second route RT2 based on the second map data MD2 from the route conversion unit 122*a*, for example, the route verification unit 122*b* starts verification processing P300 of the second route RT2 illustrated in FIG. 8. Upon starting the processing P300, the route verification unit 122*b* first executes processing P301 to generate graph data.

Figure 9:
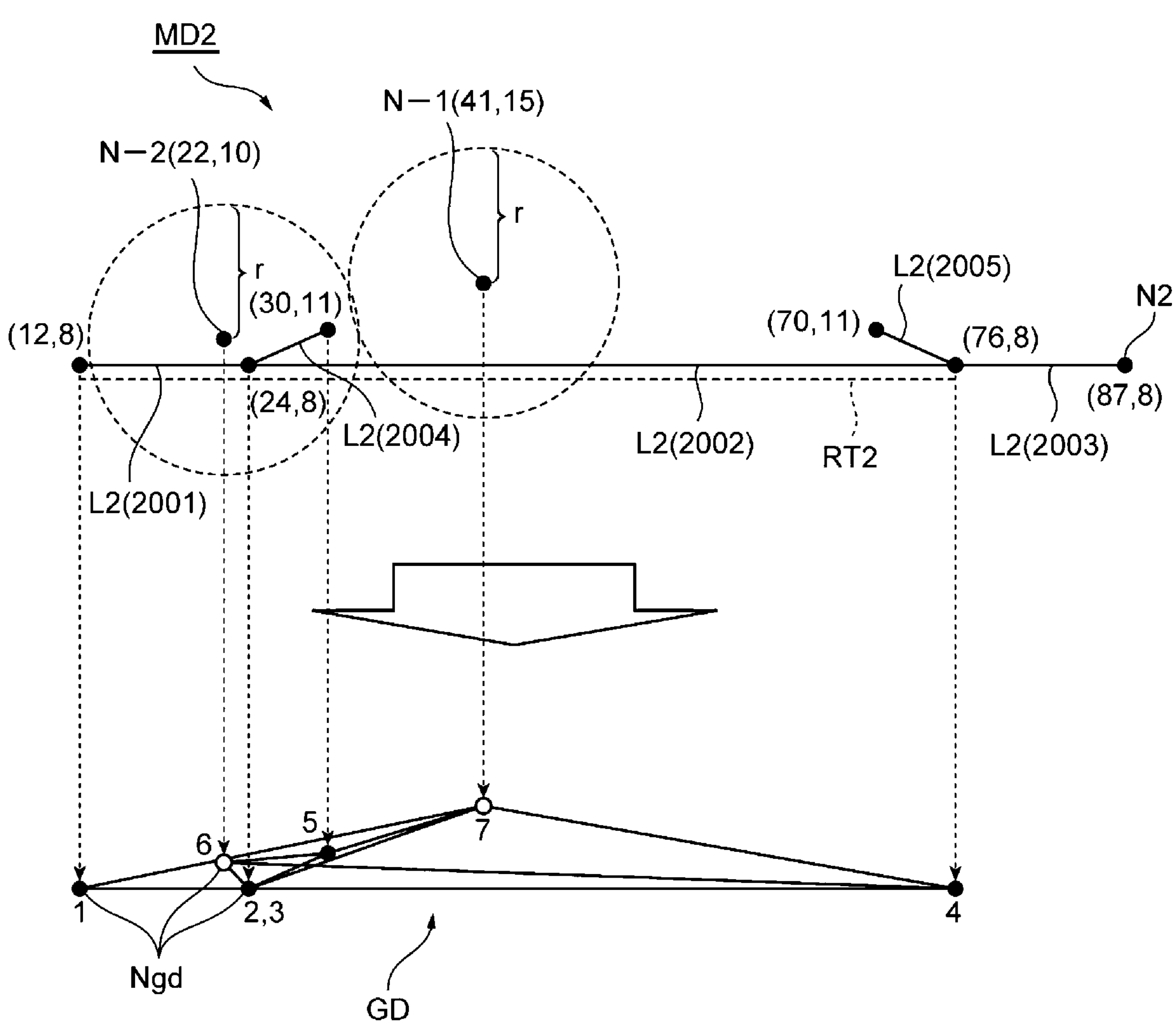
FIG. 9 is a conceptual view to describe processing to generate graph data in FIG. 8.

FIG. 9 is a conceptual view illustrating the processing P301 to generate the graph data of FIG. 8. In this processing P301, the route verification unit 122*b* generates the graph data GD based on, for example, the location reference information LRI (Table 4) of the first route RT1 and the second route RT2 in the second map data MD2 acquired from the route conversion unit 122*a*.

FIG. 9 illustrates correspondence relationships between two map point numbers N−1 and N−2 at coordinates (X, Y) of (22, 10) and (41, 15) in the location reference information LRI (Table 4) of the first route RT1, and the second route RT2, and the graph data GD. The graph data GD includes a plurality of nodes Ngd and an adjacency matrix representing the connected relationships between the nodes Ngd.

Table 8 below shows an example of the node attributes of each node Ngd of the graph data GD. Each node Ngd of the graph data GD includes, as node attributes, a node ID, a type, an X coordinate, a Y coordinate, a link orientation, and an identical node. The type, which is a node attribute of the nodes Ngd, is classified into, for example, a first type that is not included in the second route RT2, a second type that is included in the second route RT2, and a third type which is the location reference information LRI. In FIG. 9, the number near each node Ngd of the graph data GD is a node ID for uniquely identifying each node Ngd.

TABLE 8

| Node ID | Type | X coordinate | Y coordinate | Link orientation | Identical node |
|---|---|---|---|---|---|
| 1 | 2 | 12 | 8 | 90 | −1 |
| 2 | 2 | 24 | 8 | 90 | 3 |
| 3 | 1 | 24 | 8 | 65 | 2 |
| 4 | 2 | 76 | 8 | −1 | −1 |
| 5 | 1 | 30 | 11 | −1 | −1 |
| 6 | 3 | 22 | 10 | 65 | −1 |
| 7 | 3 | 41 | 15 | 90 | −1 |

$h_i^1$

As illustrated in FIG. 9, each node N2 of the second map data MD2 is converted into each node Ngd (node IDs: 1 to 5) of the first type or the second type indicated by a black circle in the graph data GD. Further, the location reference information LRI (map point numbers N−2, N−1) of the first map data MD1 in the second map data MD2 is converted into nodes Ngd of a third type (node IDs: 6, 7) represented by a white circle in the graph data GD.

The X coordinate and the Y coordinate, which are node attributes of the graph data GD, are the X coordinate and the Y coordinate of the map point number of the node N2 of the second map data MD2 or the location reference information LRI of the first map data MD1 corresponding to the node Ngd of the graph data GD. The link orientation, which is a node attribute of the graph data GD, is an orientation from each node Ngd toward the next adjacent node Ngd. This orientation is represented by an angle of 360 degrees in a clockwise direction, taking the upward direction on the paper surface of FIG. 9 as 0 degrees.

For example, the link orientation of the node Ngd (node ID: 1) toward the node Ngd (node ID: 2) illustrated in FIG. 9 is 90 degrees. Furthermore, in the case of a terminal node Ngd for which an adjacent next node Ngd does not exist, "−1" denoting the terminal is set as the link orientation, for example. Further, in a case where the node Ngd of the graph data GD is the third type and corresponds to the location reference information LRI of the first map data MD1, the orientation of each map point number of the location reference information LRI shown in Table 4 is set as the link orientation.

Further, in the graph data GD illustrated in FIG. 9, for example, two nodes Ngd (node IDs: 2 and 3) corresponding to the number of branches are generated for a node N2 at coordinates (X, Y)=(24, 8) which is a branch point of the road in the second map data MD2. In this case, as shown in Table 8, the link orientation of one node Ngd (node ID: 2) is set at 90 degrees toward the node Ngd (node ID: 4) in a straight travel direction. In addition, the link orientation of another node Ngd (node ID: 3) is set at 65 degrees toward a node Ngd (node ID: 5) in a direction branching from the straight travel direction to a diagonal left direction.

As described above, in a case where the graph data GD includes a plurality of nodes Ngd having the same coordinates corresponding to a branch point, for example, as illustrated in Table 8, the node IDs of nodes Ngd having equal coordinates are stored as identical nodes of these nodes Ngd. That is, the node ID: 3 is stored as the identical node of the node Ngd with the node ID: 2, and the node ID: 2 is stored as the identical node of the node Ngd with the node ID: 3. On the other hand, "−1" is stored, as illustrated in Table 8, as the identical node for a node Ngd not having a node Ngd at the same coordinates, for example.

As described above, by storing the link orientation and the like as a node attribute of the node Ngd in the graph data GD, information can be aggregated for the node Ngd, and machine learning (to be described below) can be effectively performed. Furthermore, as described above, the graph data GD includes a plurality of nodes Ngd and an adjacency matrix representing the connected relationships between the nodes Ngd. Table 9 below illustrates an example of the configuration of the adjacency matrix of the graph data GD.

TABLE 9

| End point node ID(i) | End point node ID(j) 1 | 2 | 3 | 4 | 5 | 6 | 7 |
|---|---|---|---|---|---|---|---|
| 1 | $\alpha_{1,1}$ | $\alpha_{1,2}$ | 0 | 0 | 0 | $\alpha_{1,6}$ | $\alpha_{1,7}$ |
| 2 | 0 | $\alpha_{2,2}$ | $\alpha_{2,3}$ | $\alpha_{2,4}$ | 0 | $\alpha_{2,6}$ | $\alpha_{2,7}$ |
| 3 | 0 | $\alpha_{3,2}$ | $a_{3,3}$ | 0 | $\alpha_{3,5}$ | $\alpha_{3,6}$ | $a_{3,7}$ |
| 4 | 0 | 0 | 0 | $\alpha_{4,4}$ | 0 | $\alpha_{4,6}$ | $\alpha_{4,7}$ |
| 5 | 0 | 0 | 0 | 0 | $\alpha_{5,5}$ | $\alpha_{5,6}$ | $\alpha_{5,7}$ |
| 6 | $\alpha_{6,1}$ | $\alpha_{6,2}$ | $\alpha_{6,3}$ | $\alpha_{6,4}$ | $\alpha_{6,5}$ | $\alpha_{6,6}$ | 0 |
| 7 | $\alpha_{7,1}$ | $\alpha_{7,2}$ | $\alpha_{7,3}$ | $a_{7,4}$ | $\alpha_{7,5}$ | 0 | $\alpha_{7,7}$ |

The adjacency matrix of the graph data GD illustrated in Table 9 is a two-dimensional matrix including a combination of a start point node ID(i) and an end point node ID(j). This adjacency matrix represents the weight of an edge connecting the start point node ID(i) and the end point node ID(j). In a case where the value of the adjacency matrix is 0, it is indicated that the start point node ID(i) and the end point node ID(j) are not connected.

For example, a value of an adjacency matrix with a combination of a start point node ID(1) and an end point node ID(2), that is, having a node Ngd with a node ID: 1 as a start point and a node Ngd with a node ID: 2 as an end point is "$a_{1,2}$" and is not zero. Therefore, these nodes Ngd are connected. Meanwhile, the value of an adjacency matrix with a combination of a start point node ID(1) and an end point node ID(5), that is, having a node Ngd with a node ID: 1 as a start point and a node Ngd with a node ID: 5 as an end point is "0", and these nodes Ngd are not connected.

Further, in a case where both the start point node ID(i) and the end point node ID(j) are the nodes Ngd corresponding to the node N2 of the second map data MD2, the connected relationship between these nodes Ngd is the same as the connected relationship between the nodes N2 in the second map data MD2. On the other hand, in a case where one of the start point node ID(i) and the end point node ID(j) is a node Ngd corresponding to the location reference information LRI of the first map data MD1, that node Ngd is connected to all the nodes Ngd corresponding to the nodes N2 of the second map data MD2. In addition, the nodes Ngd corresponding to the location reference information LRI in the first map data MD1 are not connected to each other.

Furthermore, the weight $a_{i,j}$ of the edge connecting the start point node ID(i) and the end point node ID(j) is, for example, a value obtained by subtracting the Euclidean distance between the nodes Ngd from a predetermined constant B as per the following equation (1). For example, the constant B can be set at a sufficiently large numerical value so that the weight of the edge does not become a negative value, for example.

[Math. 1]

$$a_{i,j} = B - \sqrt{dx^2 + dy^2} \tag{1}$$

As described above, in the verification processing P300 of the second route RT2 illustrated in FIG. 8, the processing P301 to generate the graph data GD ends. Next, as illustrated in FIG. 8, the route conversion device 120 executes processing P302 to verify whether the graph data GD is correct or incorrect. In this processing P302, the route conversion device 120 verifies whether the graph data GD is correct or incorrect, for example, using graph convolutional networks (GCNs) for applying the graph data GD to deep learning. GCNs is a method for repeating convolution and linear combination for graph data GD. Note that a method for machine learning the graph data GD is not particularly limited, and other methods may be adopted.

Figure 10:
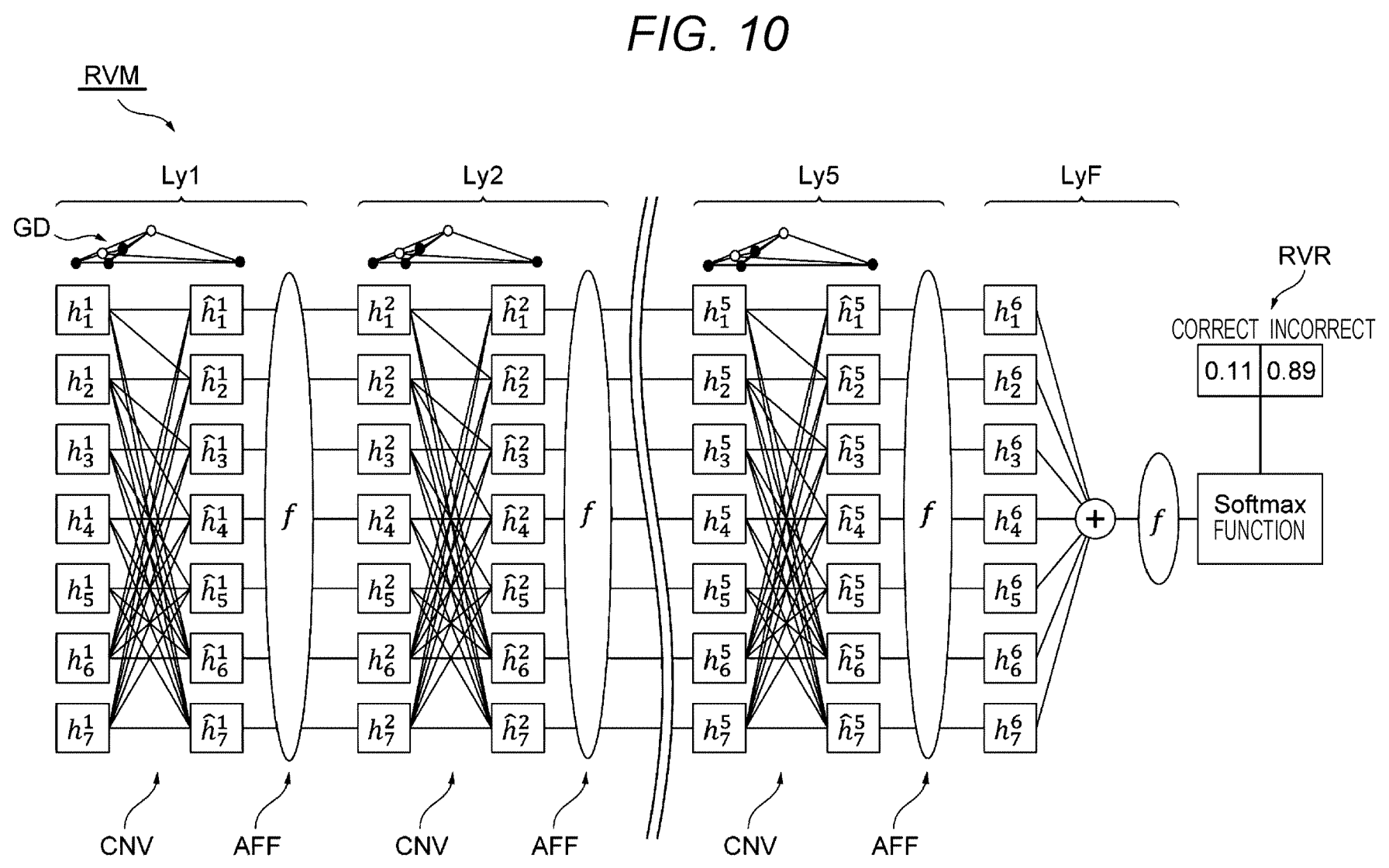

FIG. 10 is a conceptual view of the route verification model RVM stored in the storage unit 121 of the route conversion device 120 in the route conversion apparatus 100 of FIG. 1. The route verification model RVM is, for example, a machine learning model learned in advance using training data, and includes a neural network including a plurality of layers from a first layer Ly1 to a final layer LyF. The route conversion device 120 executes processing P302 to verify whether the graph data GD is correct or incorrect using, for example, the learned route verification model RVM.

Each layer from the first layer Ly1 to the fifth layer Ly5 includes convolution processing CNV to calculate an intermediate evaluation value of each node Ngd by using the graph data GD, and full join processing AFF for connecting and activating the calculated intermediate evaluation value by using a predetermined weight and bias. The intermediate evaluation value calculated by the convolution processing CNV is, for example, a value obtained by dividing, for all adjacent nodes j of a node i (a node Ngd with a node ID i) (nodes connected with the node i as the end point), the sum of values obtained by multiplying the node attributes by the weight $a_{i,j}$ of the edge in the adjacency matrix of Table 9 above, by the order of the node i (the number of edges to be connected), as shown in Formula (2) below.

[Math. 2]

$$\hat{h}_i^l = \sum_j \frac{1}{c_i} a_{i,j} h_j^l \tag{2}$$

Figure 11:
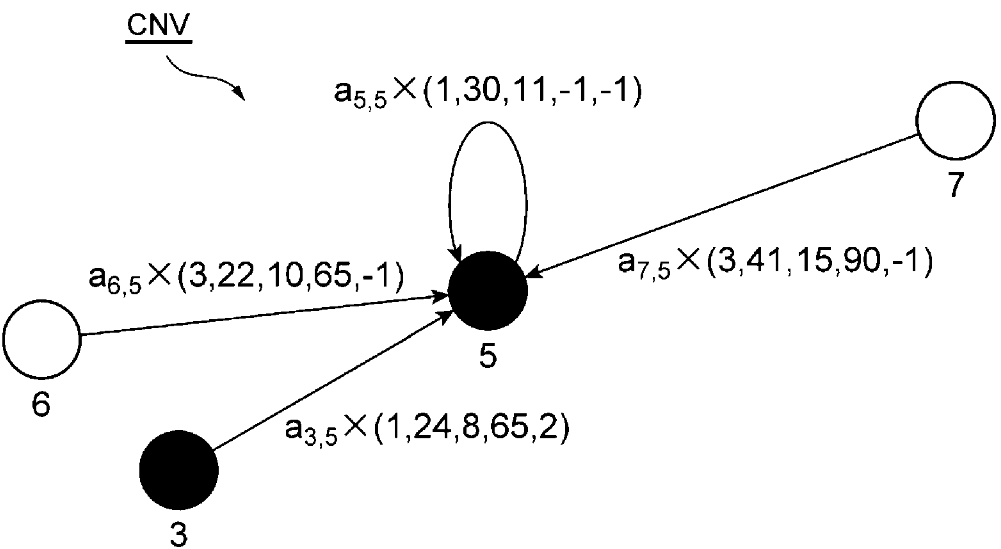
FIG. 11 is a view illustrating an example of convolution processing in a first layer of the route verification model of FIG. 10.

$j$: Node adjacent to node $i$ $l$: Layer $c_i$: Node order $a_{i,j}$: Edge distance $h_j^l$: Node attribute FIG. 11 is a view illustrating an example of convolution processing CNV in a first layer Ly1 of the route verification model RVM of FIG. 10. As shown in the adjacency matrix in FIG. 11 and Table 9, the node 3, the node 5, the node 6, and the node 7 (the nodes Ngd with the node IDs: 3, 5, 6, and 7) are adjacent to the node 5 (the node Ngd with the node ID: 5). For all these adjacent nodes, a value obtained by dividing the sum of values obtained by multiplying the weight $a_{i,j}$ of the edge and the node attributes by the order (that is, 4) of the node 5 is the intermediate evaluation value of the node 5.

Figure 12:
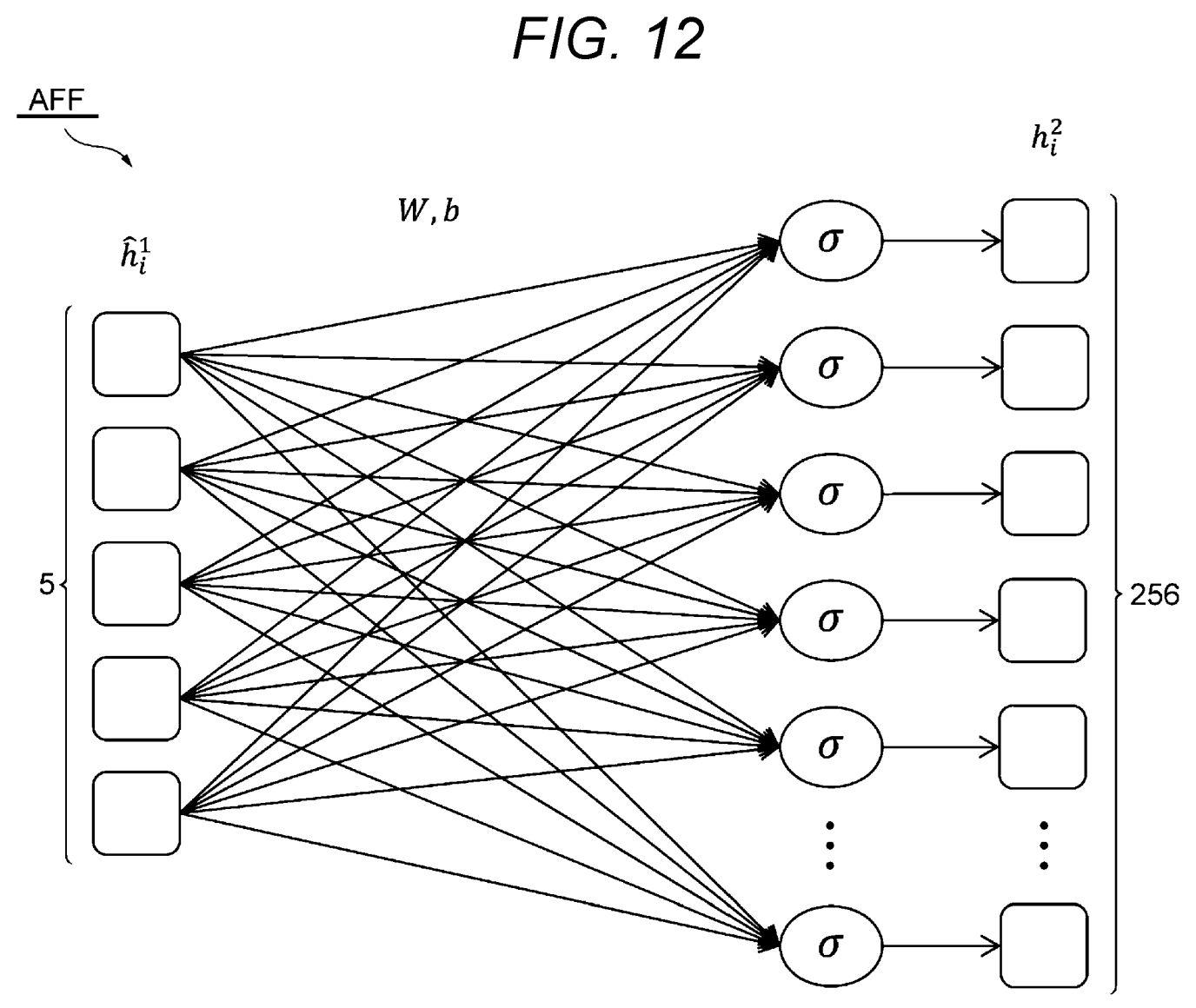

FIG. 12 is a view illustrating an example of the full join processing AFF in the first layer Ly1 of the route verification model RVM in FIG. 10. As illustrated in FIG. 12 and Formula (3) below, the full join processing AFF is processing to calculate a new node attribute of a node i by performing join processing using a weight matrix W and a bias b learned in advance on the intermediate evaluation value calculated by the convolution processing CNV and by inputting the results to an activation function.

[Math. 3]

$$h_i^{l+1} = \sigma\left(b + W\hat{h}_i^l\right) \tag{3}$$

In the first layer Ly1 of the route verification model RVM, the node attributes and the intermediate evaluation value are configured by five values, from the type among the node attributes of the graph data GD illustrated in Table 8 to the identical node. The full join processing AFF illustrated in FIG. 12 illustrates an example in which 256 values are used as the node attributes in the second layer Ly2 and subsequent layers.

In the processing P302 to verify whether the graph data GD illustrated in FIG. 8 is correct or incorrect, the route verification unit 122*b* repeats the above processing from the first layer Ly1 to the fifth layer Ly5 of the route verification model RVM. Thereafter, the route verification unit 122*b* linearly joins the results for the fifth layer Ly5 in the final layer LyF of the route verification model RVM illustrated in FIG. 10, and inputs the results to the Softmax function (activation function).

Through the above processing P302, the route verification unit 122*b* is capable of classifying the graph data GD into correct and incorrect answers and of generating the route verification result RVR. In the example illustrated in FIG. 10, the route verification result RVR includes a probability (0.11) that the graph data GD is a correct answer and a probability (0.89) that the graph data GD is an incorrect answer.

Thereafter, the route conversion device 120 ends the processing P300 illustrated in FIG. 8, and transmits the route verification result RVR generated by the route verification unit 122*b* and the second route RT2 based on the second map data MD2 generated by the route conversion unit 122*a* to the self-driving control device 130 via the communication unit 124. The self-driving control device 130 performs self-driving control of the vehicle based on the route verification result RVR and the second route RT2.

Next, an embodiment for machine learning of the route verification model RVM used in the route conversion apparatus 100 will be described. The machine learning of the route verification model RVM according to the present embodiment includes, for example, a method for generating training data based on the second map data MD2. The machine learning of the route verification model RVM can be executed by, for example, the route conversion device 120, or can be executed by another computer.

Figure 13:
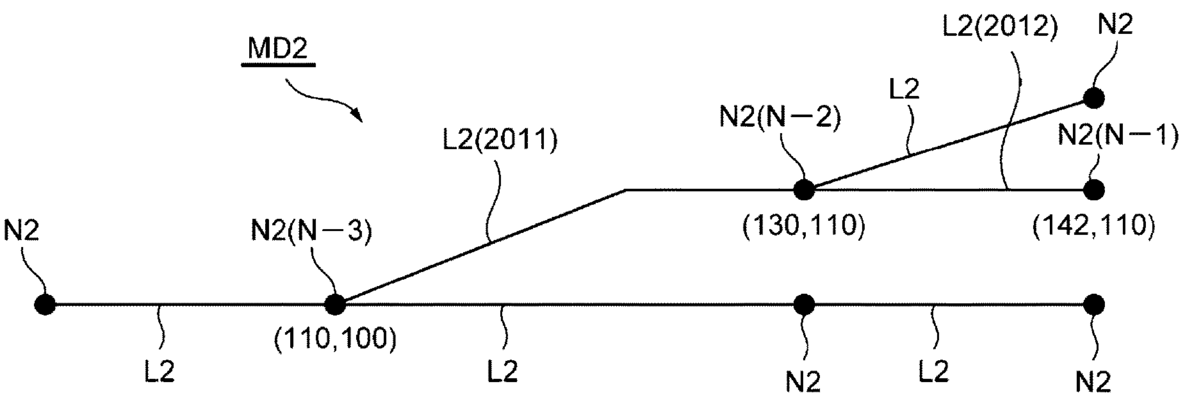
FIG. 13 is a view illustrating an example of a road network of second map data for creating training data.

FIG. 13 is a view illustrating an example of a road network of the second map data MD2 for creating training data. The road network of the second map data MD2 includes a plurality of nodes N2 and a plurality of links L2. A data configuration representing this road network is shown in Table 10 below.

TABLE 10

| | Start point | | End point | | |
|---|---|---|---|---|---|
| Link ID | X coordinate | Y coordinate | X coordinate | Y coordinate | Orientation |
| . | . | . | . | . | . |
| . | . | . | . | . | . |
| . | . | . | . | . | . |
| 2011 | 110 | 100 | 130 | 110 | 65 |
| 2012 | 130 | 110 | 142 | 110 | 90 |
| . | . | . | . | . | . |
| . | . | . | . | . | . |
| . | . | . | . | . | . |

Figure 14:
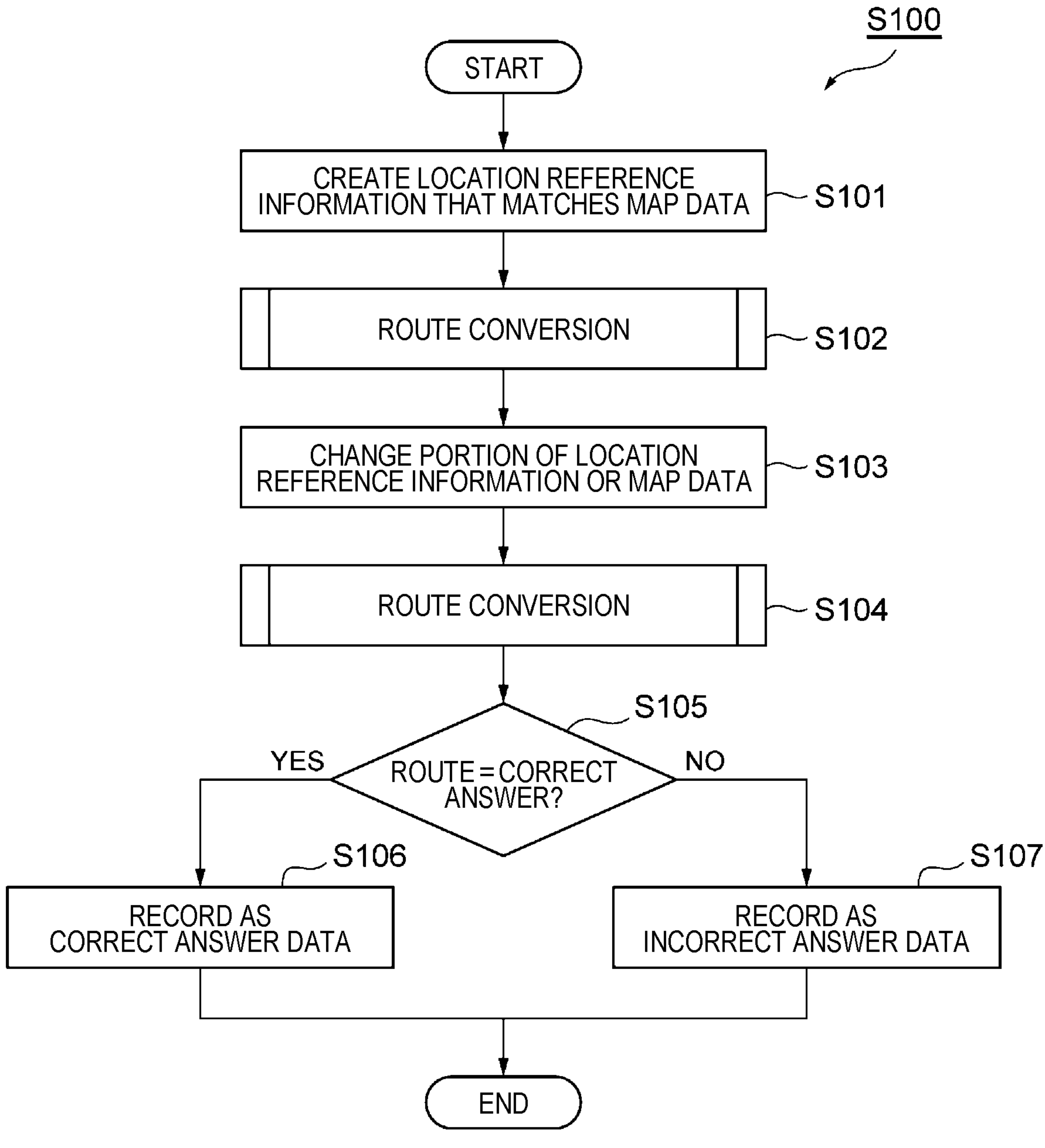
FIG. 14 is a flowchart illustrating an example of a method for generating training data.
Figure 15:
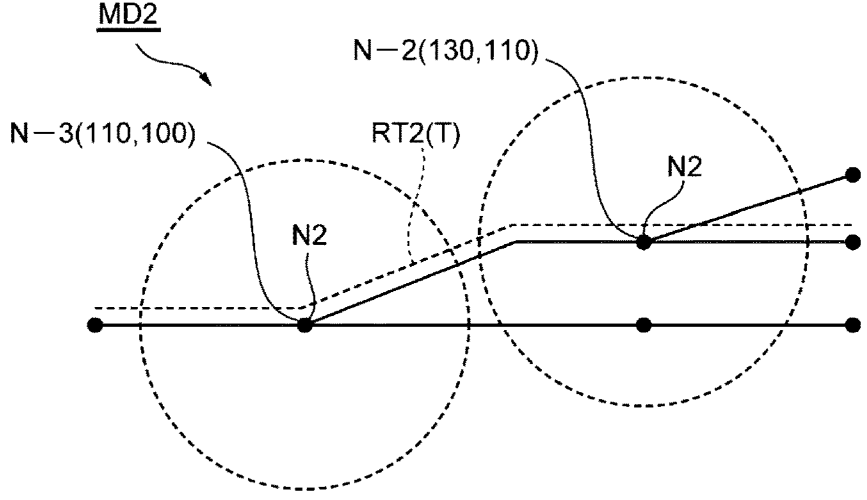
FIG. 15 is an explanatory view of a method for generating the training data illustrated in FIG. 14.
Figure 15:
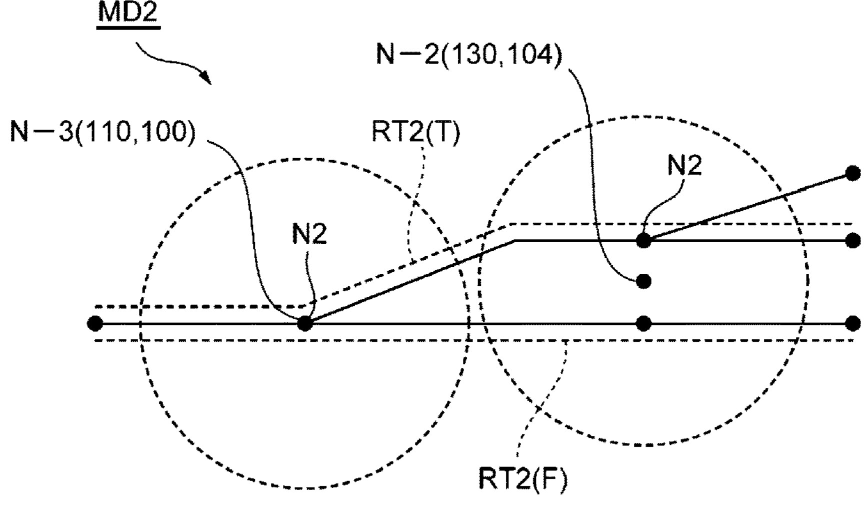
Figure 15:
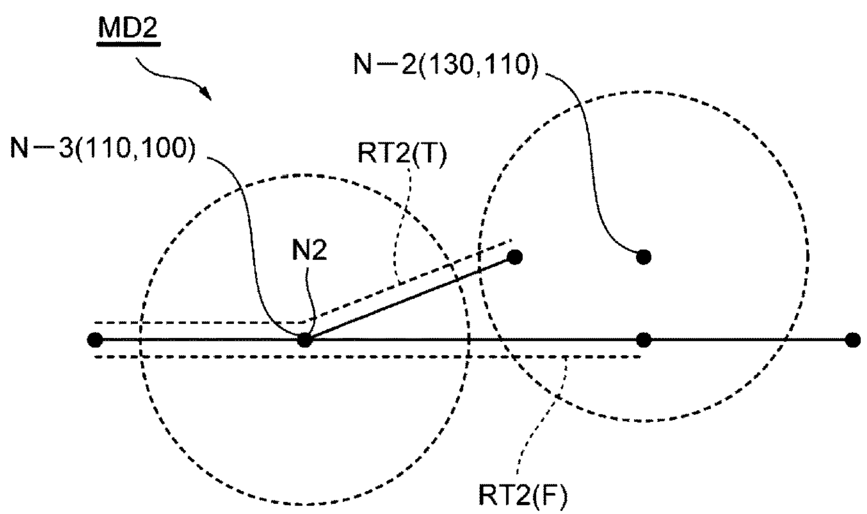

FIG. 14 is a flowchart illustrating an example of a method for generating training data S100 according to the present embodiment. FIG. 15 is an explanatory view of the method for generating training data S100 illustrated in FIG. 14. In the method for generating training data S100 according to the present embodiment, the node N2 corresponding to the node N1 included in the first route RT1 of the first map data MD1 is first selected from among the plurality of nodes N2 of the second map data MD2 in FIG. 13, and location reference information as shown in Table 11 below is created (step S101).

TABLE 11

| Number | X coordinate | Y coordinate | Orientation |
|---|---|---|---|
| . | . | . | . |
| . | . | . | . |
| . | . | . | . |
| N-3 | 110 | 100 | 65 |
| N-2 | 130 | 110 | 90 |
| N-1 | 142 | 110 | — |

Next, the second route RT2 based on the second map data MD2 is generated, similarly to the above-described processing P200 shown in FIG. 6, using the location reference information shown in Table 11 instead of the location reference information LRI of the first map data MD1 used in the above-described processing P200 (step S102). As a result, as illustrated in the upper part of FIG. 15, the second route RT2 serving as the correct answer T matching the first route RT1 of the first map data MD1 is generated.

Next, a portion of the location reference information or the second map data MD2 shown in Table 11 is changed (step S103). Table 12 below illustrates an example in which the location reference information is changed. The map point number N−2 of the location reference information shown in the upper part of Table 11 and FIG. 15 has the Y coordinate "110", but in the modification example of the location reference information shown in the center of Table 12 and FIG. 15, the Y coordinate of the map point number N−2 is changed to "104", which is shifted from the node N2 of the second map data MD2. Note that, in this example, the second map data MD2 is not changed.

TABLE 12

| Number | X coordinate | Y coordinate | Orientation |
|---|---|---|---|
| . | . | . | . |
| . | . | . | . |
| . | . | . | . |
| N-3 | 110 | 100 | 65 |
| N-2 | 130 | 104 | 90 |
| N-1 | 142 | 110 | — |

Further, in step S103, as shown in the lower part of FIG. 15, a portion of the second map data MD2 may be corrected without changing the location reference information shown in Table 11. In this example, for instance, some roads are deleted from the road network of the second map data MD2.

Next, using the location reference information changed as shown in Table 12 or the second map data MD2 changed as shown in the lower part of FIG. 15, a second route RT2 based on the second map data MD2 is generated similarly to the above-described step S102 (step S104).

Next, it is determined whether the second route RT2 generated in step S104 is a correct answer (step S105). Specifically, it is determined whether or not the correct answer T of the second route RT2 generated in step S102 described above and illustrated in the upper part of FIG. 15 matches the second route RT2 generated in step S104 described above and illustrated in the center or the lower part of FIG. 15. Here, as illustrated in the lower part of FIG. 15, in a case where a portion of the second map data MD2 is changed, it is determined whether or not the correct answer T of the second route RT2 illustrated in the upper part of FIG. 15 matches the second route RT2 illustrated in the lower part of FIG. 15, at least within a range recorded in the second map data MD2.

In step S105, in a case where the correct answer T of the second route RT2 generated in step S102 and the second route RT2 generated in step S104 match each other at least within the range recorded in the second map data MD2, it is determined that the second route RT2 generated in step S104 is the correct answer T (YES). Then, the location reference information used in step S104, the second route RT2 generated in step S104, and the data of the road network based on the second map data MD2 illustrated in FIG. 13 are recorded as correct answer data (step S106). Thus, the method for generating training data S100 illustrated in FIG. 14 ends.

On the other hand, in step S105, in a case where the correct answer T of the second route RT2 generated in step S102 does not match the second route RT2 generated in step S104, it is determined that the second route RT2 generated in step S104 is not the correct answer T (NO), that is, the incorrect answer F. Further, the location reference information used in step S104, the second route RT2 generated in step S104, and the data of the road network based on the second map data MD2 illustrated in FIG. 13 are recorded as incorrect answer data (step S107). Thus, the method for generating training data S100 illustrated in FIG. 14 ends.

By applying the method for generating training data S100 illustrated in FIG. 14 to each map point based on the second map data MD2, it is possible to generate a plurality of pieces of training data including the second route RT2 of the correct answer T and the second route RT2 of the incorrect answer F.

As described above, the route conversion apparatus 100 according to the present embodiment is an apparatus that converts the first route RT1 based on the first map data MD1 into the second route RT2 based on the second map data MD2. The route conversion apparatus 100 includes a route conversion unit 122*a* that generates a second route RT2 based on location reference information LRI of a first route RT1, a storage unit 121 that stores a route verification model RVM, and a route verification unit 122*b* that inputs the second map data MD2, the location reference information LRI, and the second route RT2 to the route verification model RVM to verify whether the second route RT2 is correct or incorrect.

With such a configuration, the route conversion apparatus 100 according to the present embodiment is capable of converting, for example, the first route RT1 based on the first map data MD1 for car navigation into the second route RT2 based on the second map data MD2 for self-driving, by using the route conversion unit 122*a*. Furthermore, the route conversion apparatus 100 according to the present embodiment is capable of verifying, using the route verification unit 122*b*, whether the second route RT2, which is based on the second map data MD2 converted and reconfigured by the route conversion unit 122*a*, is correct or incorrect.

As a result, for example, in a case where the self-driving control device 130 performs the self-driving of the vehicle, the vehicle is prevented from traveling along a second route RT2 which is different from the first route RT1 based on the first map data MD1, and thus the safety of the self-driving control can be improved. More specifically, for example, even in a case where there are similar roads in a narrow range including roads running side by side, such as a main line and a side road, it is possible to detect that a reconfigured second route RT2 is different from the original first route RT1. Therefore, it is possible to improve the accuracy of the road traffic information and improve safety of self-driving and advanced driving support, and the like, along the first route RT1 generated by the route search device 110 such as a car navigation system.

In addition, the route conversion unit 122*a* and the route verification unit 122*b* of the route conversion apparatus 100 according to the present embodiment can be configured as a route verification program. That is, the route verification program (the route conversion unit 122*a* and the route verification unit 122*b*) according to the present embodiment is a program for verifying whether the second route RT2, which is based on the second map data MD2 generated by converting the first route RT1 based on the first map data MD1, is correct or incorrect. The route verification program according to the present embodiment causes the route conversion apparatus 100, which is a computer, to function so as to input the second map data MD2, the location reference information LRI, and the second route RT2 to the route verification model RVM to verify whether the second route RT2 is correct or incorrect. With such a configuration, the route verification program according to the present embodiment is capable of affording advantageous effects similar to those of the route conversion apparatus 100 described above.

In addition, in the route conversion apparatus 100 or the route verification program according to the present embodiment, the route verification model RVM is a machine learning model which is machine-learned using training data. The training data includes location reference information LRI of the first route RT1, graph data GD in which a plurality of nodes N2 included in the second route RT2 obtained by converting the first route RT1 are connected by edges, and information indicating whether the route conversion in the graph data GD is correct or incorrect. With such a configuration, the route conversion apparatus 100 according to the present embodiment is capable of performing machine learning of the route verification model RVM by inputting the training data together with the graph data GD to the route verification model RVM.

Furthermore, in the route conversion apparatus 100 or the route verification program according to the present embodiment, the training data further includes the type of the node Ngd, the orientation of the location reference information and of the connection destination of the node Ngd, the coordinates of the node Ngd, and the distance between adjacent nodes Ngd. With such a configuration, it is possible to verify whether the graph data GD is correct or incorrect by using GCNs in which the graph data GD is applied to deep learning.

In addition, the method for generating training data S100 according to the present embodiment is a method for generating training data of a route verification model RVM that is a machine learning model for verifying whether the second route RT2, which is based on the second map data MD2 generated by converting the first route RT1 based on the first map data MD1, is correct or incorrect. The method for generating training data S100 according to the present embodiment includes a step of generating the graph data GD by connecting, by edges, the location reference information LRI of the first route RT1 and a plurality of nodes N2 included in the second route RT2 obtained by converting the first route RT1, and a step of determining whether the route conversion in the graph data GD is correct or incorrect. With such a configuration, machine learning of the route verification model RVM can be performed by inputting the training data to the route verification model RVM together with the graph data GD.

Furthermore, in the method for generating training data S100 according to the present embodiment, in the step of generating the graph data GD, attributes, which include the type of the node Ngd, the orientation of the location reference information LRI and of the connection destination of the node Ngd, the coordinates of the node Ngd, and the distance between adjacent nodes Ngd, are assigned to the node Ngd. With such a configuration, it is possible to verify whether the graph data GD is correct or incorrect by using GCNs in which the graph data GD is applied to deep learning.

Note that the route conversion apparatus according to the present disclosure is not limited to the route conversion apparatus 100 according to the foregoing embodiment. For example, the route conversion apparatus may be configured to generate the second route RT2 itself instead of the correct or incorrect second route RT2. Specifically, the route verification model RVM used in the route conversion apparatus may be configured to generate the second route RT2 itself. In this case, the graph data GD is generated by a node Ngd of a first type corresponding to the node N2 of the second map data MD2 and a node Ngd of a third type corresponding to the location reference information LRI of the first map data MD1. Then, the convolution processing CNV and the full join processing AFF are repeated for the graph data GD, from the first layer Ly1 to the fifth layer Ly5. Thereafter, the attributes of each node Ngd are extracted in the final layer LyF. Among the attributes of the extracted node Ngd, a node N2 of the second map data MD2 corresponding to a node Ngd of a second type is the second route RT2.

As described above, according to the present embodiment, it is possible to provide the route conversion apparatus 100, and peripheral technologies thereof, which enable the first route RT1 based on the first map data MD1 to be converted into the second route RT2 based on the second route RT2, within a range narrower than one section of the electronic map. Furthermore, according to the present embodiment, it is possible to provide the route conversion apparatus 100, and peripheral technologies thereof, which enable detection of an incorrect answer F of the converted second route RT2 and conversion of the detected incorrect answer F into a correct second route RT2.

Second Embodiment

Figure 16:
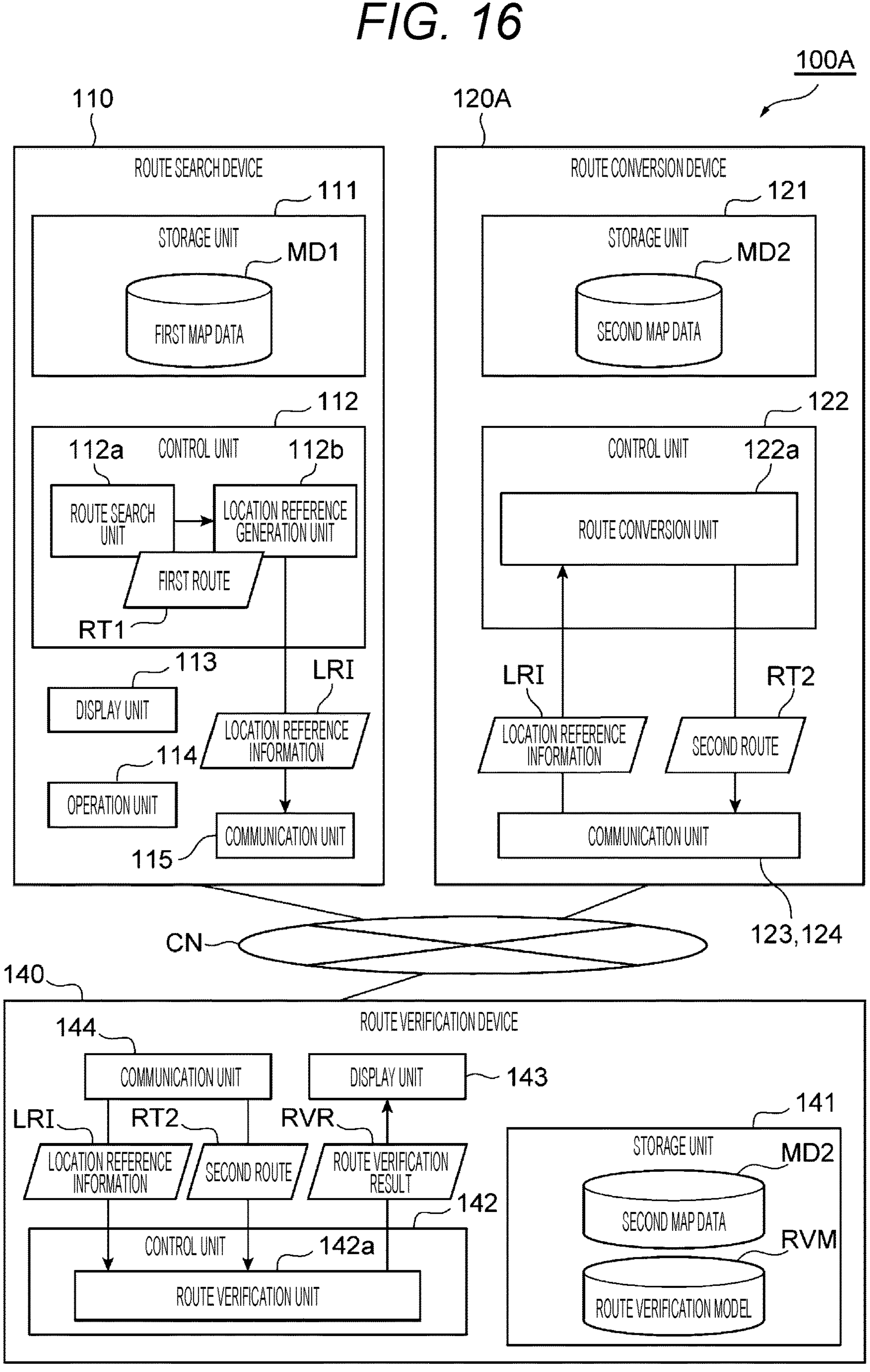
FIG. 16 is a block diagram illustrating a second embodiment of the route conversion apparatus according to the present disclosure.

Hereinafter, a second embodiment of the route conversion apparatus according to the present disclosure will be described with reference to FIG. 16. FIG. 16 is a block diagram illustrating the second embodiment of the route conversion apparatus according to the present disclosure.

In the first embodiment described above, an example has been described in which, in the route conversion apparatus 100, the route conversion device 120 includes a route conversion unit 122*a* and a route verification unit 122*b*. In contrast, a route conversion apparatus 100A according to the present embodiment includes a route verification device 140 instead of the self-driving control device 130. The route conversion device 120A includes a route conversion unit 122*a*, and the route verification device 140 includes a route verification unit 142*a*. Because the other configurations of the route conversion apparatus 100 according to the present embodiment are similar to those of the route conversion apparatus 100 according to the first embodiment described above, the same components are denoted by the same reference signs, and descriptions thereof are omitted.

Although the route conversion device 120A does not include the route verification unit 122*b*, the other configurations are similar to those of the route conversion device 120 according to the first embodiment described above. The route conversion device 120A generates, using the route conversion unit 122*a*, the second route RT2 based on the second map data MD2 from the location reference information LRI of the first route RT1 based on the first map data MD1, and transmits the second route RT2 to the route verification device 140 via the communication unit 124.

The route verification device 140 is, for example, a server installed in a data center. The route verification device 140 includes a storage unit 141 that stores the second map data MD2 and the route verification model RVM, a control unit 142 including a route verification unit 142*a*, a display unit 143, and a communication unit 144. The route verification unit 142*a* has a configuration similar to that of the route verification unit 122*b* in the route conversion apparatus 100 according to the first embodiment. The display unit 143 and the communication unit 144 have the same configurations as the display unit 113 and the communication unit 115 in the route conversion apparatus 100 according to the first embodiment.

The route verification unit 142*a* receives the location reference information LRI of the first route RT1 based on the first map data MD1 from the route search device 110 via the communication network CN, which includes an Internet connection, and the communication unit 144. In addition, the route verification unit 142*a* receives the second route RT2 based on the second map data MD2 from the route conversion device 120 via the communication network CN and the communication unit 144. In addition, the route verification unit 142*a* outputs the route verification result RVR to the display unit 143 to be displayed.

The route conversion apparatus 100A according to the present embodiment affords not only the same advantageous effects as those of the route conversion apparatus 100 according to the first embodiment described above, but also high computational power can be provided by placing the route verification device 140 on the outside of the vehicle. As a result, it is possible to increase the number of layers of the route verification model RVM illustrated in FIG. 10 or increase the number of states of each node of the second and subsequent layers, thereby enabling improved accuracy of the route verification model RVM.

Although the embodiments of the route conversion apparatus, the route verification program, and the method for generating training data according to the present disclosure have been described in detail hereinabove with reference to the drawings, the specific configuration is not limited to such embodiments, and even if there are design changes or the like within a range not departing from the gist of the present disclosure, such changes or the like are included in the present disclosure.

For example, in the foregoing embodiments, normal map data used in a general car navigation system is exemplified as the first map data, and high-precision map data for self-driving is exemplified as the second map data. However, the first map data and the second map data are not limited to this example, and may be different map data.

REFERENCE SIGNS LIST

100 route conversion apparatus (computer)
100A route conversion apparatus (computer)
121 storage unit
122*a* route conversion unit (route verification program)
122*b* route verification unit (route verification program)
141 storage unit
142*a* route verification unit (route verification program)
GD graph data
LRI location reference information
MD1 first map data
MD2 second map data
RT1 first route
RT2 second route
RVM route verification model
S100 method for generating training data

The invention claimed is:

1. A route conversion apparatus, mounted in a vehicle, that converts a first route, from a departure point to a destination, based on first map data into a second route, from the departure point to the destination different from the first route, based on second map data, the route conversion apparatus comprising a controller configured to:

generate the second route based on location reference information of the first route, wherein the location reference information includes a plurality of map point numbers, each map point number includes an x coordinate, a y coordinate, and an orientation;

store a route verification model;

input the second map data, the location reference information, and the second route to the route verification model to verify whether the second route is correct or incorrect;

display a route verification result representing a result of the verification of the second route; and transmit the route verification result to a self-driving control device such that the self-driving control device performs self-driving control of the vehicle based on the route verification result and the second route;

wherein the route verification model comprises a machine learning model that inputs training data; and wherein the training data includes the location reference information of the first route, graph data generated by connecting, by edges, the location reference information of the first route and a plurality of nodes in the second route obtained by converting the first route, and information indicating whether the route conversion in the graph data is correct or incorrect, the information determined using graph convolutional networks.

2. The route conversion apparatus according to claim 1, wherein the training data further includes a type of the node, an orientation of the location reference information and of a connection destination of the node, coordinates of the node, and a distance between adjacent nodes, and wherein the type of node is at least one of a first type that is not included in the second route, a second type that is included in the second route, or a third type that is the location reference information.

3. A route verification program storable in a non-transitory memory comprising instructions for causing a controller to function so as to verify whether a second route, from a departure point to a destination, based on second map data, which is generated through conversion of a first route, from the departure point to the destination the second route different from the first route, based on first map data, is correct or incorrect, wherein the second map data, location reference information of the first route, and the second route are inputted to a route verification model to verify whether the second route is correct or incorrect, wherein the location reference information includes a plurality of map point numbers, each map point number includes an x coordinate, a y coordinate, and an orientation;

wherein a route verification result representing a result of the verification of the second route is displayed;

wherein the route verification result is transmitted to a self-driving control device such that the self-driving control is performed based on the route verification result and the second route;

wherein the route verification model comprises a machine learning model that inputs training data, and wherein the training data includes the location reference information of the first route, graph data generated by connecting, by edges, the location reference information of the first route and a plurality of nodes in the second route obtained by converting the first route, and information indicating whether the route conversion in the graph data is correct or incorrect, the information determined using graph convolutional networks.

4. The route verification program according to claim 3, wherein the training data further includes a type of the node, an orientation of the location reference information and of a connection destination of the node, coordinates of the node, and a distance between adjacent nodes;

wherein the type of node is at least one of a first type that is not included in the second route, a second type that is included in the second route, or a third type that is the location reference information.

5. A method for generating training data of a route verification model, stored on a controller, the route verification model comprising a machine learning model, that inputs the training data, for verifying whether a second route, from a departure point to a destination, which is based on second map data generated by converting a first route, from the departure point to the destination the second route different from the first route, based on first map data, is correct or incorrect, the route verification model being configured, when executed, to output a route verification result and the controller being configured to transmit the route verification result to a self-driving control device such that the self-driving control device controls operation of a vehicle based on the route verification result and the second route, the method comprising:

a step of generating graph data by connecting, by edges, location reference information of the first route and a plurality of nodes included in the second route obtained by converting the first route, wherein the location reference information includes a plurality of map point numbers, each map point number includes an x coordinate, a y coordinate, and an orientation; and a step of determining, using graph convolution networks, whether the route conversion in the graph data is correct or incorrect.

6. The method for generating training data according to claim 5, wherein, in the step of generating the graph data, attributes, which include a type of the node, an orientation of the location reference information and of a connection destination of the node, coordinates of the node, and a distance between adjacent nodes, are assigned to the graph data;

wherein the type of node is at least one of a first type that is not included in the second route, a second type that is included in the second route, or a third type that is the location reference information.

* * * * *